March 3, 1964 E. R. LIEBERMAN 3,123,653
METHOD OF PRODUCING A TUBULAR COLLAGEN CASING
Filed Jan. 16, 1961 12 Sheets-Sheet 1
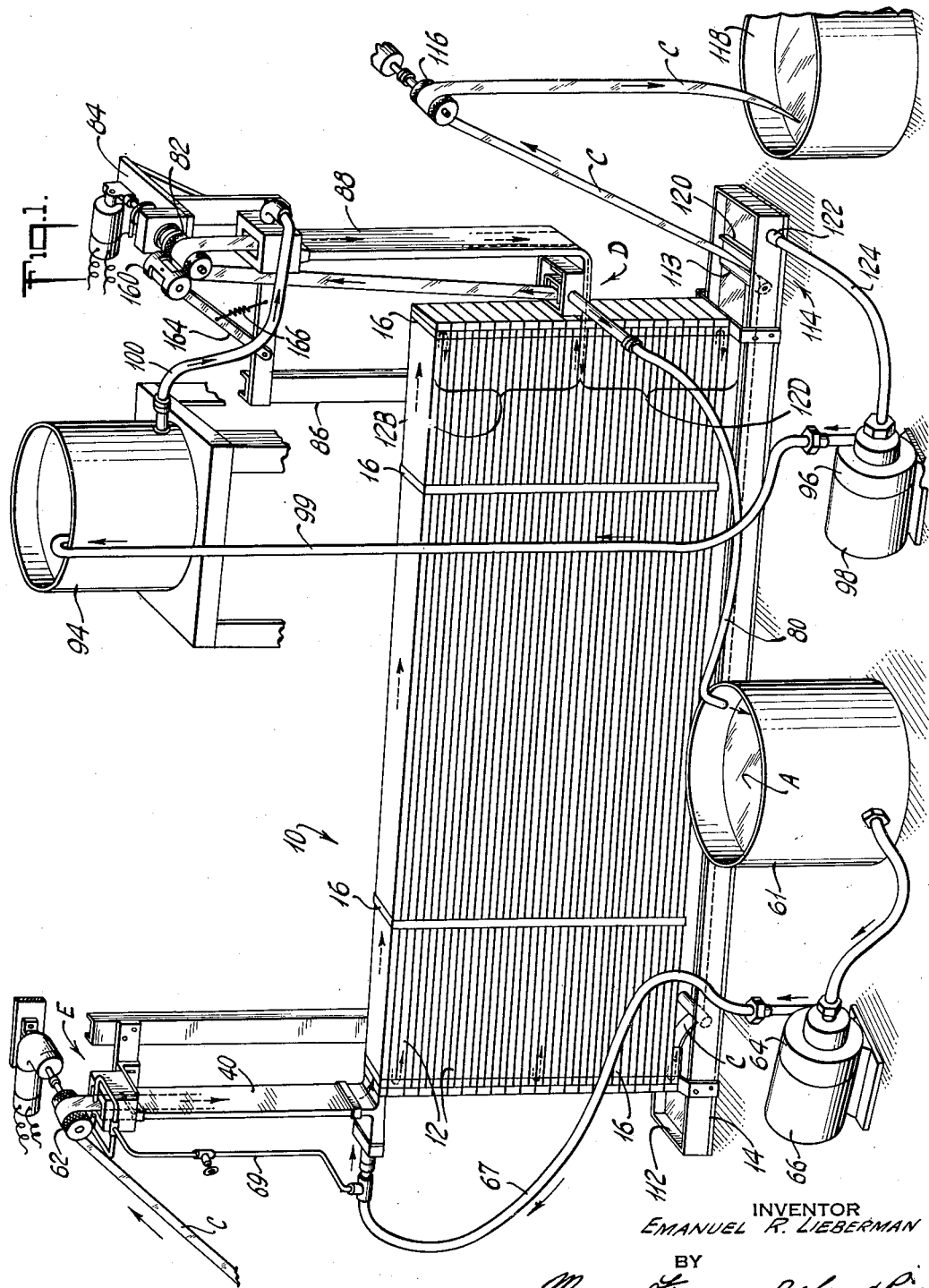
INVENTOR
EMANUEL R. LIEBERMAN
BY
Morgan Finnegan Durham & Pine
ATTORNEYS

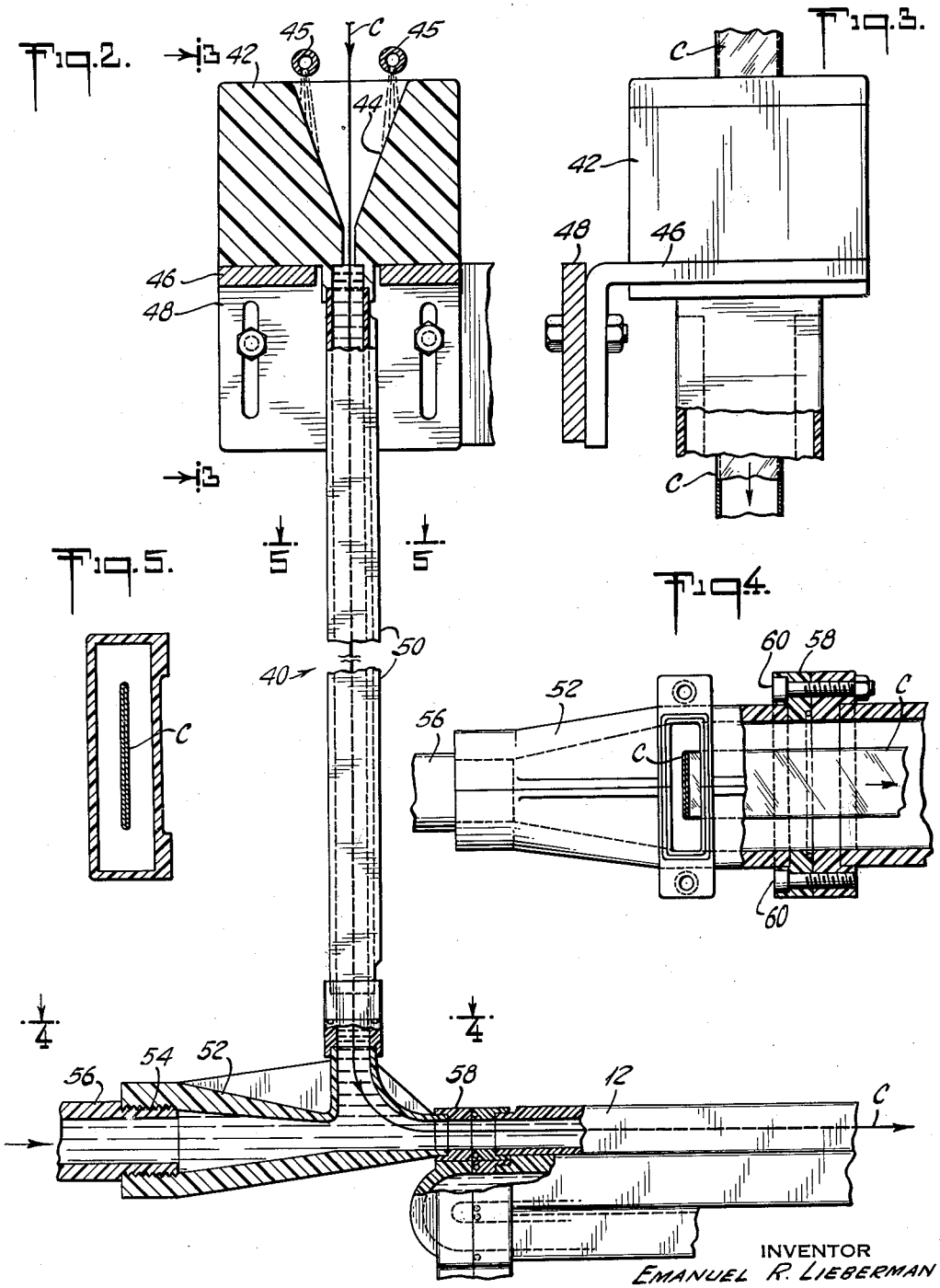

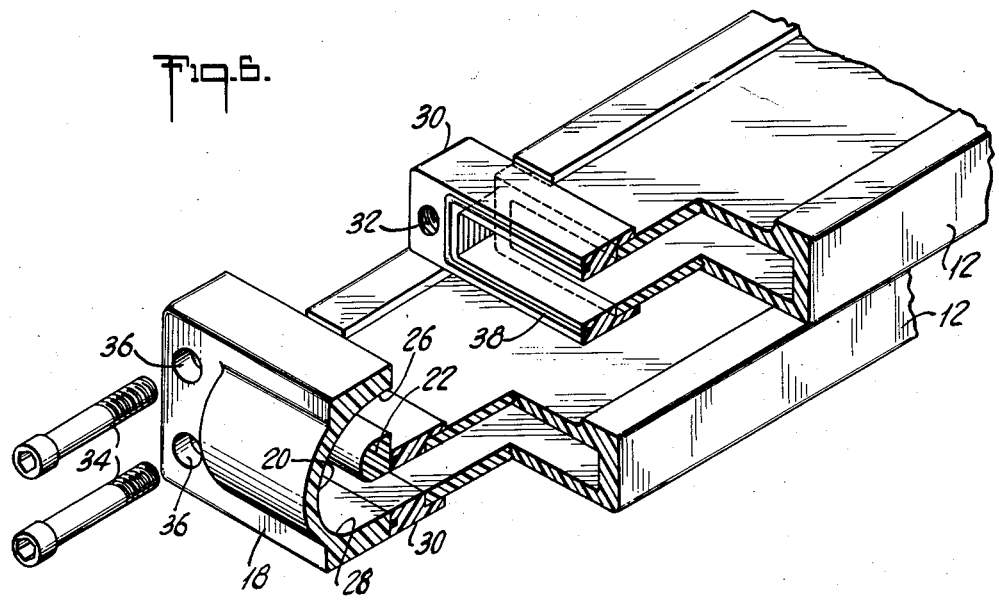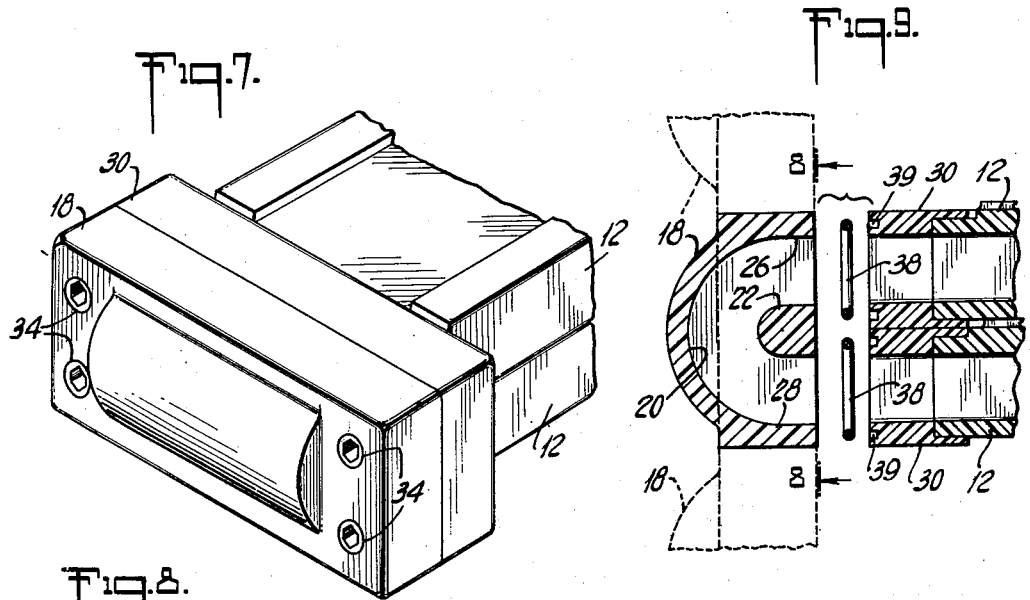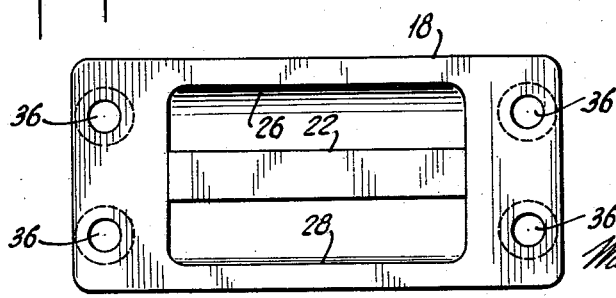

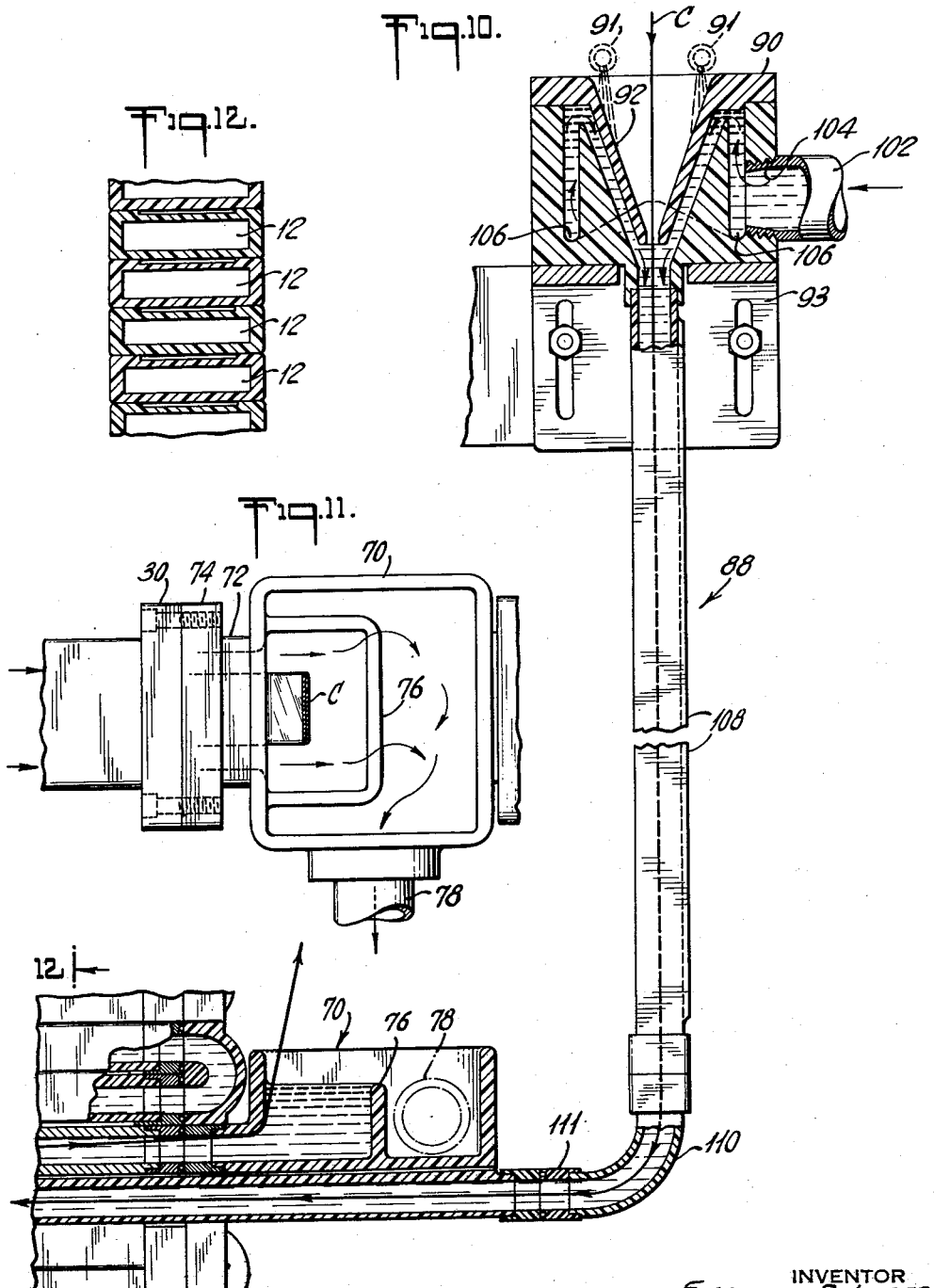

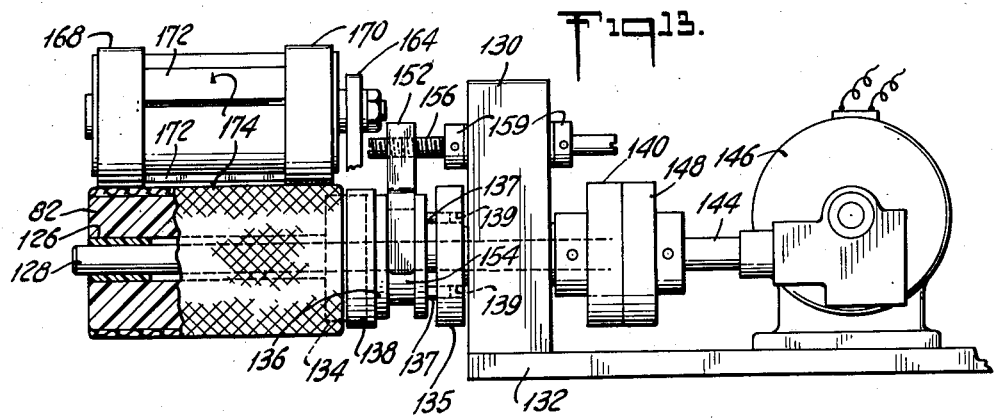
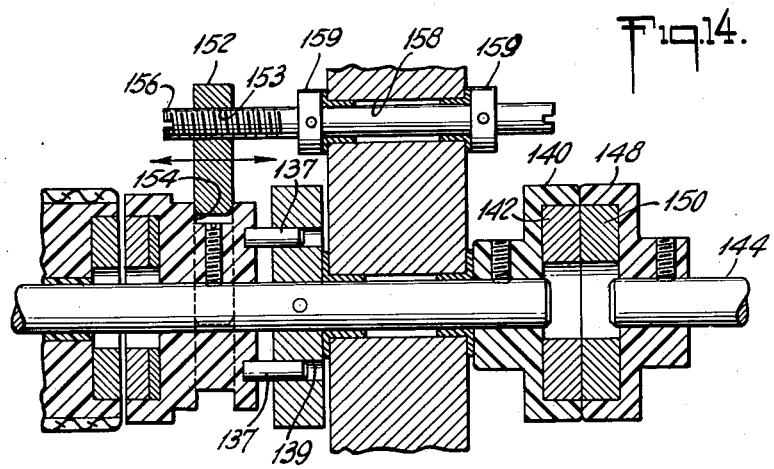
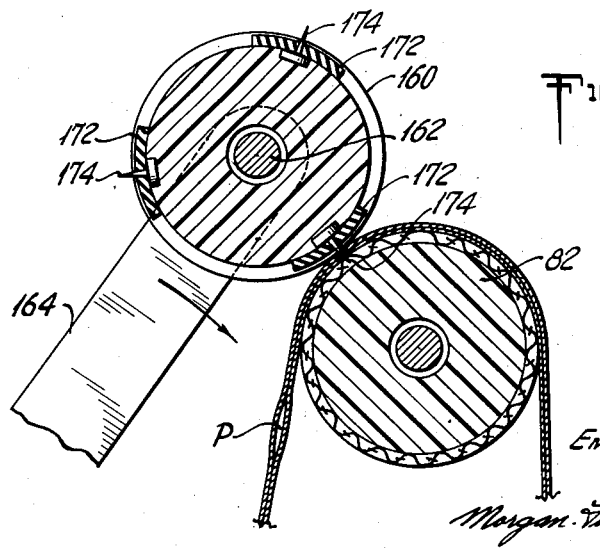

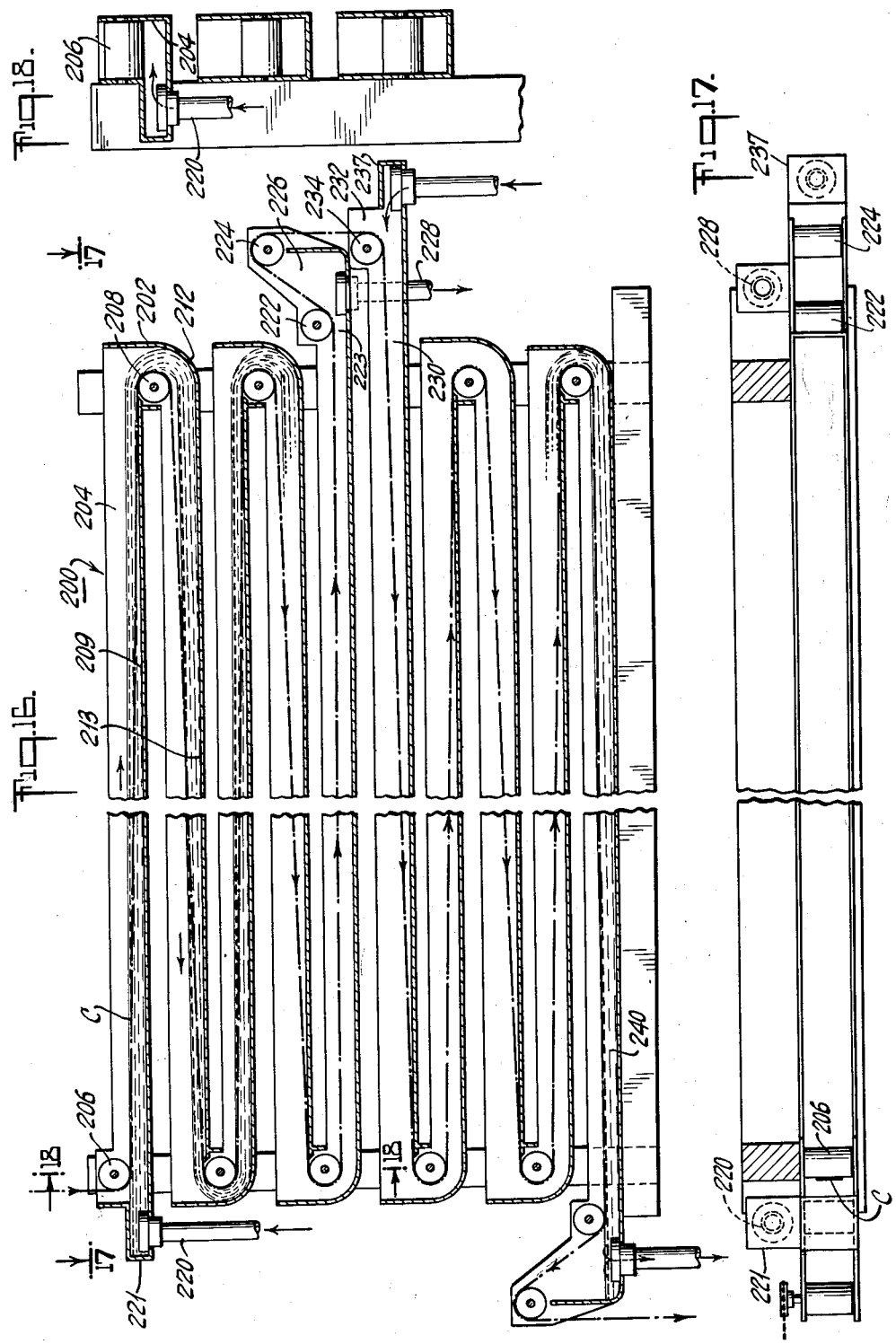

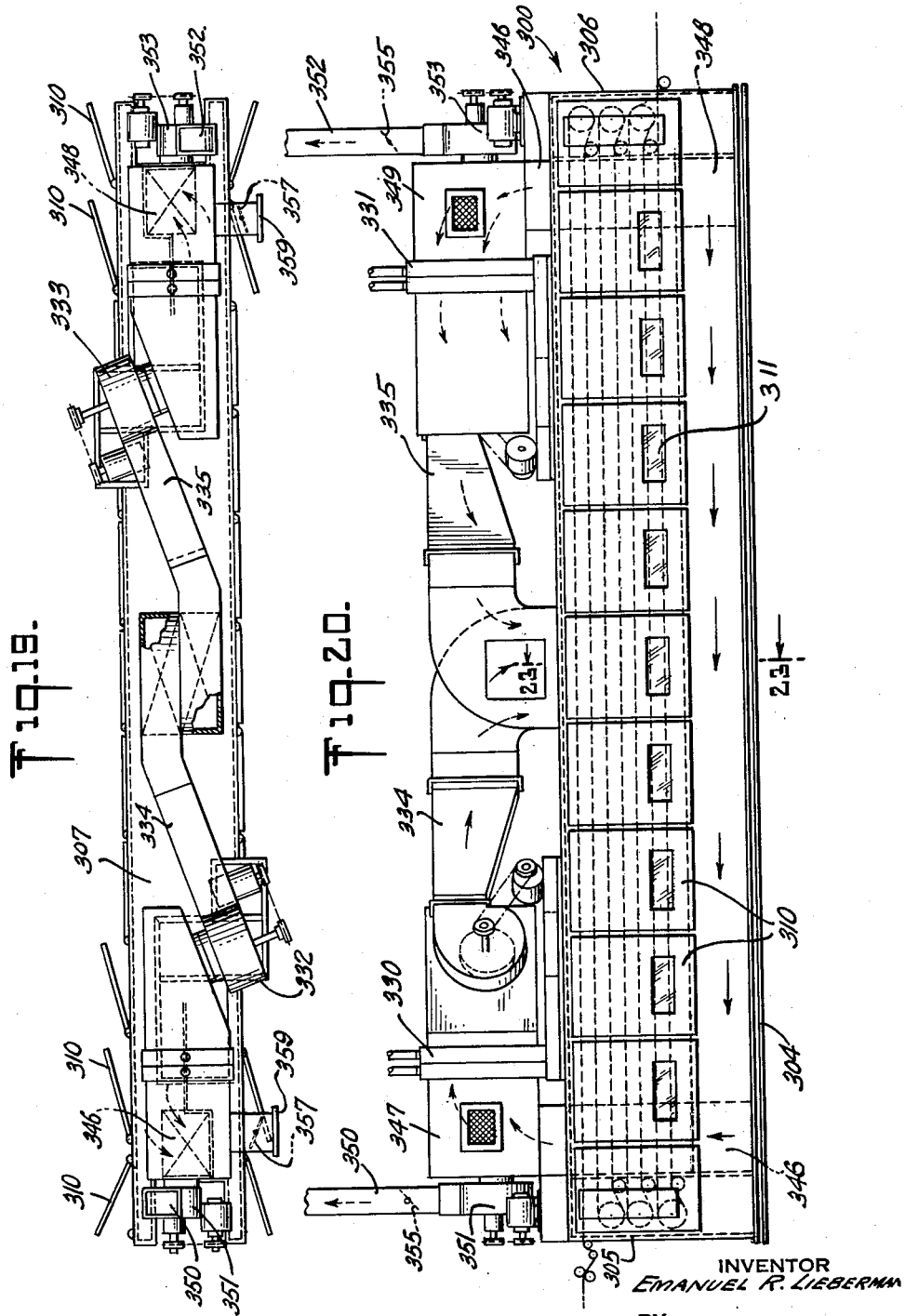

March 3, 1964 E. R. LIEBERMAN 3,123,653
METHOD OF PRODUCING A TUBULAR COLLAGEN CASING
Filed Jan. 16, 1961 12 Sheets-Sheet 8

INVENTOR
EMANUEL R. LIEBERMAN
BY
Morgan Finnegan Durham & Pine
ATTORNEYS

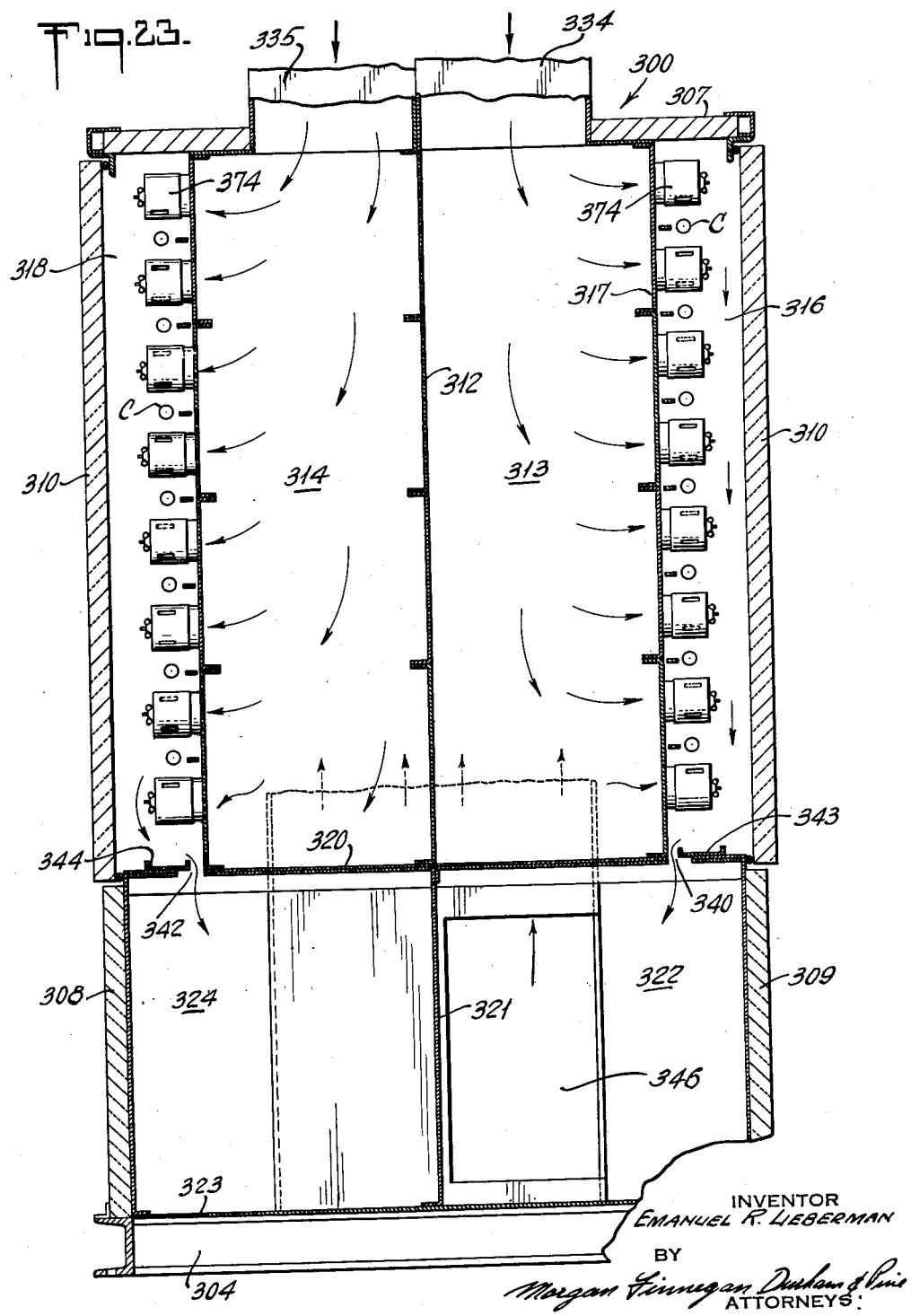

March 3, 1964 E. R. LIEBERMAN 3,123,653
METHOD OF PRODUCING A TUBULAR COLLAGEN CASING
Filed Jan. 16, 1961 12 Sheets-Sheet 10
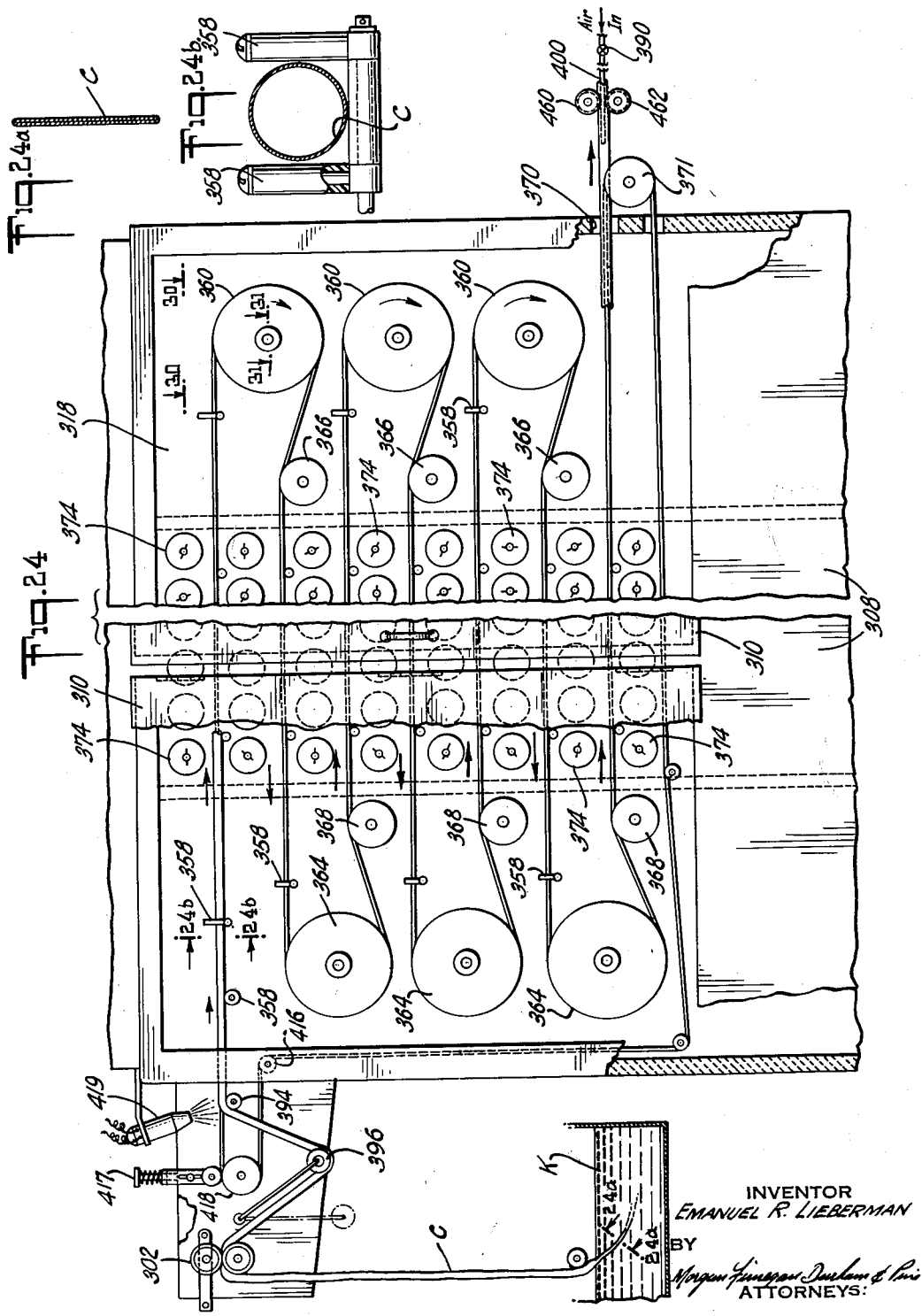
INVENTOR
EMANUEL R. LIEBERMAN
BY
ATTORNEYS:

March 3, 1964 E. R. LIEBERMAN 3,123,653
METHOD OF PRODUCING A TUBULAR COLLAGEN CASING
Filed Jan. 16, 1961 12 Sheets-Sheet 11
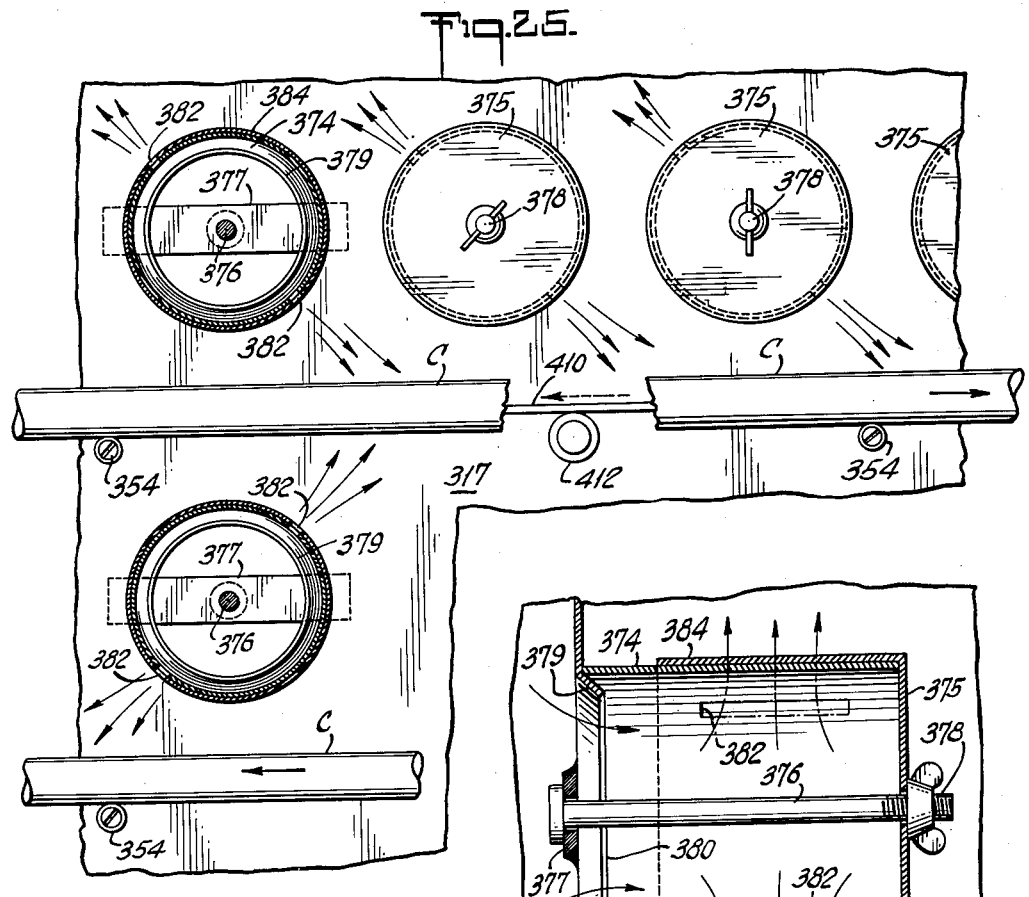
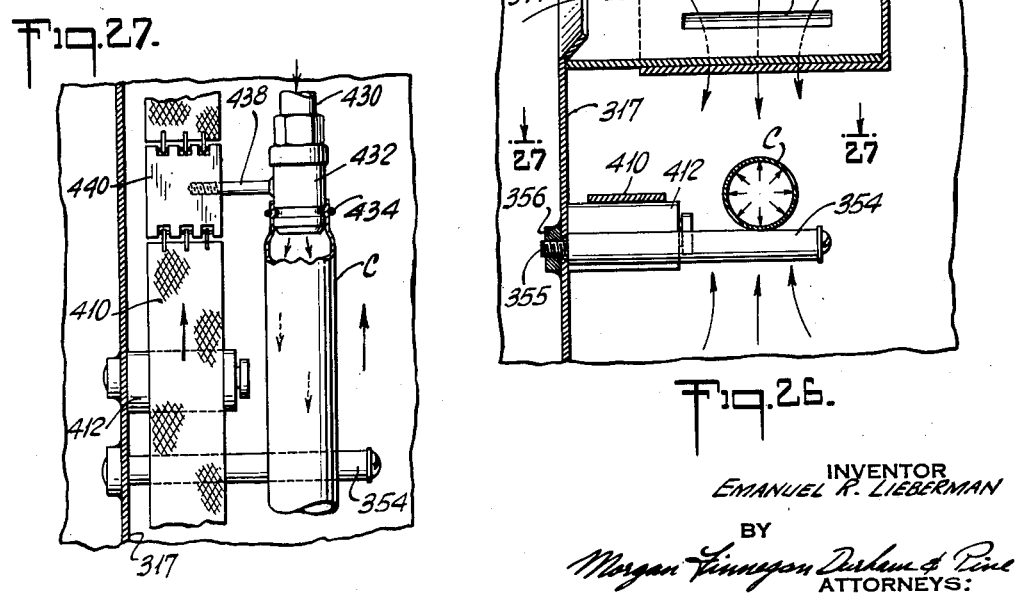
INVENTOR
EMANUEL R. LIEBERMAN
BY
Morgan Finnegan Durham & Pine
ATTORNEYS:

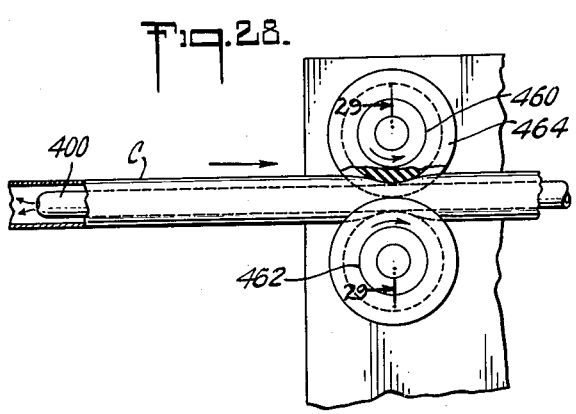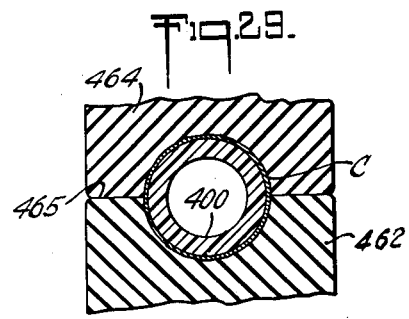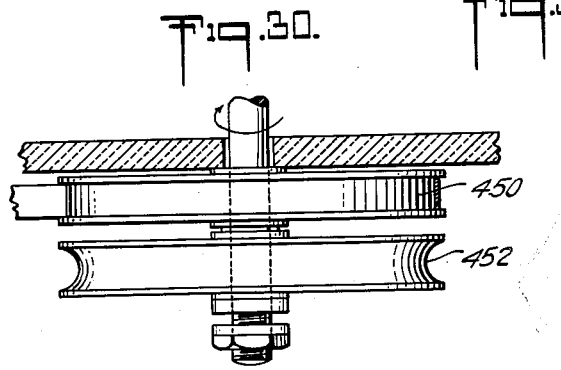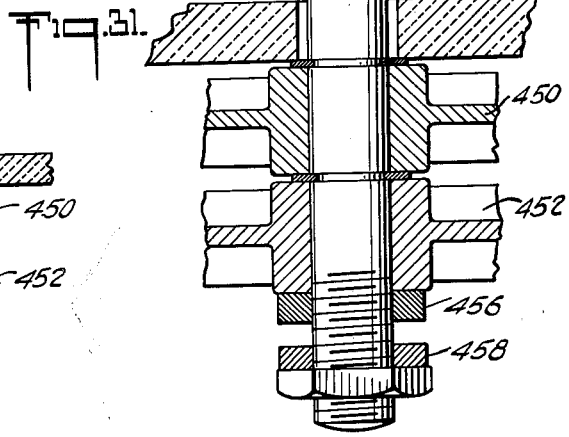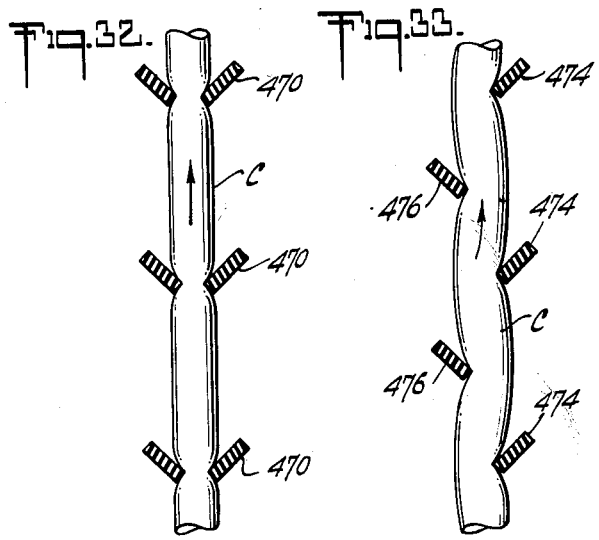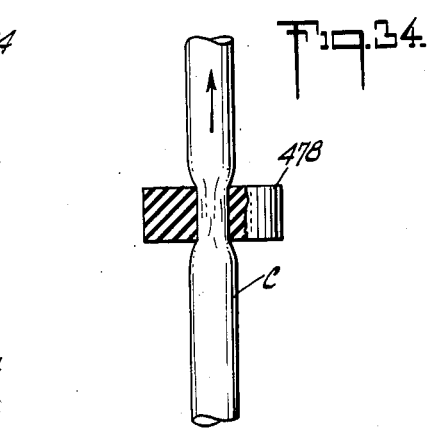

United States Patent Office 3,123,653
Patented Mar. 3, 1964

3,123,653
METHOD OF PRODUCING A TUBULAR
COLLAGEN CASING
Emanuel Roy Lieberman, Somerville, N.J., assignor to
Johnson & Johnson, a corporation of New Jersey
Filed Jan. 16, 1961, Ser. No. 82,934
8 Claims. (Cl. 264—99)

This invention relates to new and useful methods and apparatus for producing a new and improved collagen tube by continuous extrusion and after-treatments.

The product of the invention is particularly adapted to be utilized as an edible casing for fresh pork sausages which must be cooked by the consumer, as well as sausages of the wiener or frankfurter type. The latter sausages are generally processed by being smoked and cooked by the packer and are generally reheated before they are consumed. When such sausages are provided with edible casings, it is unnecessary to remove the casing before the sausage is eaten.

Natural casings, i.e., those prepared from the intestines of animals such as cattle, swine and sheep, suffer from a number of disadvantages which limit their acceptance. Tender edible casings can be obtained from optimum quality sheep intestines but because of their rarity and difficulties involved in their preparation, such tender edible casings command a high price. Other casings from the cleaned intestines of animals are frequently tough and unpleasant to eat. This is generally true of casings made from hog and beef intestines, but is also frequently the case when made from sheep intestines. In addition, the thickness of the wall and diameter of natural casings will vary, causing difficulty during modern high speed stuffing.

In view of the obvious deficiencies of natural casings and the expense of preparing such casings for human consumption, many attempts have been made to prepare a better edible casing from other sources of collagen.

It has heretofore been proposed to produce an artificial collagen casing from fibrous animal material such as, for example, dehaired hide which has been subjected to conventional liming treatments. Collagen in such limed fibrous material is converted by mechanical disintegration and the swelling action of acids into a paste of fiber bundles and fibers which is then extruded to form a tube. Such paste or pasty masses commonly have a solids content of the order of 10% to 25%, although in some cases the solids have been as low as about 8%. These pastes are extruded under relatively great pressures of the order of hundreds of atmospheres. The tubes so produced are relatively thick, tough and difficult to masticate after cooking.

These undesirable properties of prior artificial collagen casings are further increased and complicated by the types of treatments to which the tubes are commonly subjected after extrusion. Thus upon extrusion the tubes are solidified by application of hot air or alternatively by successive treatments with water-removing liquids, tanning agents and/or wood smoke. These after-treatments, while designed to contribute mechanical strength to the casings, not only concomitantly increase their toughness and non-edibility after cooking but also have the undesirable effect of decreasing the flexibility and of increasing the shrinkage tension during cooking. Such casings, when stuffed with edible meat, will not survive in the frying pan because cooking temperatures cause the collagen casing to shrink, extruding the meat product.

In accordance with the present invention, it has been discovered that an exceedingly thin-walled tube of collagen casing material may be produced from a fluid mass of swollen collagen fibrils having a solids content much lower than heretofore used, i.e. of the order of at least 2.5%, and less than 6%, preferably about 3.5% to 5%. It has been observed that collagen fibrils in unlimed cowhide will swell to more than 100 times their original volume if comminuted cowhide, progressively reduced in particle size to very small dimensions, is placed in a sufficient quantity of a weak acid solution, such as 1.2% of lactic acid in water. The pressure of the swelling of the constituent fibrils will rupture the relatively inelastic fiber sheath that surrounds the fiber containing the fibrils, thus destroying the identity of the fiber. The swollen collagen fibrils may then be separated from remnants of the fiber sheaths by filtration. Thin-walled tubular casing material formed by extrusion from such a relatively watery mass of exceedingly fine swollen fibrils, when subjected to the post-extrusion treatments of the present invention, will produce sausage casings which are very tender and so easy to masticate that in eating they can scarcely be distinguished from the sausage meat itself. Nevertheless sausage casings prepared in accordance with the present invention possess sufficient tensile strength and burst-strength that they may be shirred, stuffed and linked in commercial practice without rupture or undue stretching. Moreover such casings have been found to survive the stresses and temperatures involved in cooking in the frying pan so that there is substantially no shrinkage, rupturing or melting of the casing or extrusion of the meat product therefrom during the cooking process.

However, the utilization of swollen collagen masses in which the collagen material has been reduced to particles of fibrillar size and in which the proportion of collagen solids in the swollen fibrillar mass is of the low order above described, introduces problems of tremendous difficulty in treating and handling the extruded tubular body from the moment it leaves the orifice of the extruder until it has been dried and reduced to the ultimate size in which it is to be shirred and later used. Thus the extrusion of such a watery or low-solids material produces an exceedingly fragile tubular body which must be handled with the greatest delicacy and care during the subsequent treatments in which it is coagulated, hardened, plasticized and dried.

In the first instance, when the mass of swollen collagen solids leaves the extruder orifice, it is essentially a liquid which must be immediately given a coagulating treatment in order to preserve the shape imparted to the liquid as it leaves the mouth of the extruder and is still travelling under the kinetic energy imparted by the extrusion force. Once this initial coagulation takes place, the extruded tubular body possesses tangible form and integrity of its own, but nevertheless remains weak, fragile and subject to rupture as it passes in the wet state through subsequent conditioning treatments. In spite of its fragile nature the exacting requirements of continuous production are such that this initially watery tubular body must be reduced from an initial wall thickness at the extruder orifice of, e.g., about 14 mils to an ultimate wall thickness of about 1 mil, while preserving the interior diameter imparted to it at the extruder orifice. Moreover, these dimensional requirements must be met while moving the fragile tubular body under treatment at high speed into, through and out of a variety of baths of conditioning liquids. The recognition and the solution of these processing difficulties and the provision of apparatus for carrying out the requisite treatment steps comprise some of the foundations of the present invention.

*Definitions*

For the sake of clarity and brevity, certain terms used in the specification and claims are defined as follows:

By the term "collagen fibril" is meant the structural unit of collagenous tissues made up of many thousands or even millions of tropocollagen units. The collagen fibril, as it is found in cowhide, measures in the completely dehydrated state about 50 to 1000 Angstroms in diameter and is of indefinite length. Cowhide collagen fibrils measuring 20,000,000 Angstroms (2 millimeters) in length have been observed. The collagen fibrils in bovine hide are arranged in bundles to form collagen fibers measuring many thousands of Angstroms in diameter and of indefinite length.

Cowhide collagen fibers have been observed which measure about 10,000 to 20,000 Angstroms in the dehydrated state and larger collagen fibers measuring as much as 1 millimeter (10,000,000 Angstroms) in diameter in their dehydrated state are believed to exist. Each collagen fiber contains hundreds or even thousands of fibrils, all bound together by a sheath. The collagen fibers, in turn, are organized into bundles of collagen fibers that are large enough to be seen by the naked eye and form the familiar fibrous network visible in hides of all sorts.

The term "swollen collagen fibril" in the context of this application is the state assumed by collagen fibrils after fragments of cowhide or the like have been progressively reduced in size and the fibrils therein are swollen to more than 100 times their original volume in a sufficient quantity of a weak acid solution. The pressure of the swelling of the constituent fibrils will rupture the relatively inelastic fiber sheath that surrounds the fibrils, thus destroying the identity of the fiber. The swollen collagen fibrils may then be separated from remnants of the fiber sheath by filtration. It must be emphasized, however, that to achieve disruption of the fiber structure by swelling, the ratio of swelling fluid to collagen must be high.

The term "fluid mass of swollen collagen fibrils" is herein applied to such a mass after filtration and when ready for extrusion. In that state the separated fiber sheaths have been largely removed. In accordance with the present invention such a fluid mass of swollen collagen fibrils should contain from about 2.5% to about 6% of collagenous tissue on a dry-weight basis.

Typical casings of the present invention have the following illustrative properties when tested on an Instrom tensile tester by the method described in copending application Serial No. 82,935, filed as of even date herewith. Each casing sample is heated to 99° C. with live steam prior to testing.

The change of length due to shrinkage of a 3 inch sample of the casing heated to 99° C. with live steam amounts to from about 1.0 inch to about 2.0 inches.

The strain in inches per pound of stress is from about 2.0 to about 20.0 inch pounds.

The hot tensile strength is from about 0.10 pound to about 1.00 pound.

The shrink tension is from about 0.08 pound to about 0.50 pound.

The percentage recovery (length of the casing at the break point) divided by original length of sample being tested times 100) amounts to from about 81 to about 150.

The burst strength is at least about 10 to 28 pounds per square inch. "Burst strength" is the air pressure in pounds per square inch required to burst dry extruded collagen casing having a wall thickness of 1 mil. The values of "burst strength" expressed in this specification were determined on a Perkins Mullen tester (model C). Fluid under uniformly increasing pressure expands against a distensible rubber diaphragm and, simultaneously, into a Bourdon pressure gauge. The material to be tested is clamped securely to a metal plate through which the diaphragm is free to expand through a circular opening against one square inch of its surface. As the sample distorts under pressure, the diaphragm assumes the exact contour of the material, uniformly distributes the pressure over the entire test area, and protrudes into any imperfection or weak section to burst or rupture it at that point. When the pressure drops at the moment of rupture, the gauge registers the maximum pressure reached to indicate the exact pressure at the time the bursting occurred.

Objects

It is an object of the present invention to produce a new and improved extruded collagen casing having characteristics superior to casings of the prior art.

It is a further object of this invention to produce a continuous extruded collagen tube that may be shirred, stuffed and linked on modern high-speed machinery.

It is also an object of this invention to provide novel methods and apparatus capable of producing strong, thin-walled collagen casings in a simple and relatively inexpensive manner and in high quantities.

Another object of the invention is to produce strong, thin-walled collagen casings which, when stuffed with sausage emulsion, are edible after cooking; which do not burst, rupture or melt under the stresses and temperatures of cooking; and which do not shrink or extrude emulsion during cooking.

Another object of the invention is to provide new and useful apparatus for moving a continuously extruded tubular body or swollen collagen fibrils, having low solids content, into and through a series of treatment baths in which the tubular body is successively coagulated; then hardened so as to resist water deformation; then water washed to remove coagulant therefrom; then plasticized (to preserve softness after drying) while simultaneously being subjected to some chemical water-removal and treated to increase burst strength of the ultimate casing; then dried under conditions which maintain the initially imparted internal diameter of the tubing as extruded while reducing the water content so as to provide a wall thickness of the order of 1 mil in the dried casing.

Another object of the invention, related to the maintenance of the aforesaid inner diameter of the tubing, is to avoid undue inflation and stretching of the tube during treatment and particularly during drying so as to maintain a sufficient elasticity or capacity for elongation in the tubular casing during the stuffing operation so that linking of successive stuffed sausages may be accomplished. In this connection it has been found that the wetting which conventionally accompanies the stuffing operation will effect just enough elongation of casings so prepared to permit linking of adjacent casings without harm to the integrity of the stuffed casings. However, if the tubular body is stretched substantially beyond its inner extrusion diameter by inflation during drying, this property of elongation during the rewetting is lost and satisfactory linking cannot be achieved.

It will be understood that the foregoing general description and the following detailed description as well are exemplary and explanatory but are not restrictive of the invention.

Drawings

Referring now in detail to the present preferred embodiment of the invention, illustrated by way of example in the accompanying drawings:

FIG. 1 is a perspective view of an apparatus embodying those features of the present invention for applying successive conditioning liquids to the tubular body under treatment;

FIG. 2 is a sectional side elevation of a penstock for admitting the tubular body to liquid in the conditioning system while maintaining hydraulic pressure therein;

FIG. 3 is a view taken along line 3—3 of FIG. 2;

FIG. 4 is a view taken along line 4—4 of FIG. 2;

FIG. 5 is a view taken along line 5—5 of FIG. 2;

FIG. 6 is an exploded perspective view, partly in section, of the connecting means for a pair of continuous liquid-carrying troughs;

FIG. 7 is a perspective view of the connecting means shown in FIG. 6 in operating position joining the troughs;

FIG. 8 is an end view of the mechanism shown in FIG. 7;

FIG. 9 is an exploded side elevation in section of the mechanism shown in FIG. 7;

FIG. 10 is a sectional side elevation of a second liquid admitting means in association with a liquid exit means;

FIG. 11 is a plan view of the liquid exit means;

FIG. 12 is an end sectional view of a plurality of troughs in tiered relationship;

FIG. 13 is a side elevation of the tube puncturing means;

FIG. 14 is a sectional view of the drive means for the tube puncturing means;

FIG. 15 is an end sectional view of the tube puncturing means and its drive means in operating relationship;

FIG. 16 is a longitudinal vertical section of an open-trough apparatus illustrating a modification of the hydraulic system of the invention;

FIG. 17 is a top plan view of the apparatus of FIG. 16, with parts in section, taken on line 17—17 of FIG. 16;

FIG. 18 is a fragmentary vertical transverse section taken on line 18—18 of FIG. 16;

FIG. 19 is a top plan view, on reduced scale, of a drying apparatus utilized in carrying out the invention;

FIG. 20 is a front elevation of the apparatus shown in FIG. 19;

FIG. 23 is an enlarged transverse vertical section taken on line 23—23 of FIG. 20;

FIG. 24 is a fragmentary front elevation of the apparatus shown in FIG. 20 with some parts shown diagrammatically and other parts in section;

FIG. 24a is a cross section of tubular body before inflation, taken on line 24a—24a of FIG. 24;

FIG. 24b is a cross section on line 24b—24b of FIG. 24 showing the inflated tubular body;

FIG. 25 is an enlarged fragmentary elevation, with parts in section, showing the construction and arrangement of air-jet manifolds for drying and advancing the tubular body;

FIG. 26 is a fragmentary vertical section on line 26—26 of FIG. 25;

FIG. 27 is a fragmentary horizontal section on line 27—27 of FIG. 26;

FIG. 28 is a fragmentary side elevation of the feed rollers adjacent the shirring mandrel;

FIG. 29 is a vertical section on line 29 of FIG. 28;

FIG. 30 is a fragmentary top plan, with parts in section, showing the double-track godets for driving the tubular body through the drying chamber;

FIG. 31 is an enlarged horizontal section showing details of the construction of FIG. 30;

FIG. 32 is a fragmentary diagrammatic view showing means for wiping moisture from the casing tube as it is being drawn toward the drying chamber;

FIG. 33 is a view similar to FIG. 32 showing a modification of the wiping members; and FIG. 34 is another view similar to FIG. 32 showing a second modification.

Method or Process Steps

Figure 21:
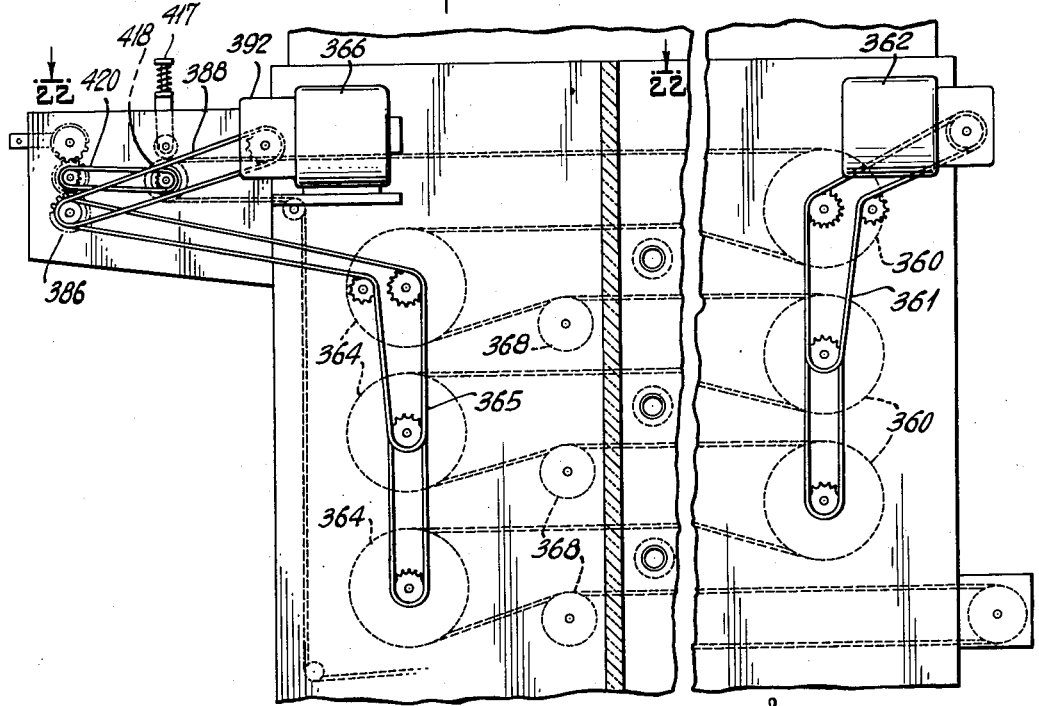
FIG. 21 is an enlarged, detailed front elevation similar to FIG. 20, showing the driving mechanisms, with parts broken away.

The preferred method for preparing the dilute fluid mass of swollen collagen fibrils to be extruded and conditioned in accordance with the invention utilizes as the raw material fresh (frozen or salted), dehaired hides, preferably bovine, which have not been treated with lime or other alkaline agents nor with enzymes. Representative examples illustrating the preparation of such preferred mass of swollen collagen fibrils are disclosed in copending application Serial No. 64,664, filed October 24, 1960. That application also generally discloses, primarily in a chemical sense, the other treatment steps to which the extruded tubular body of swollen collagen fibrils is subjected in carrying out the method steps embodying the present invention. Example I of that application is set forth below for the purpose of illustrating and explaining the various method and physical treatment steps employed in the present invention, but the invention is not limited to such example, as will be clear to those skilled in the art.

In said example, fresh steer hides are washed with cold water at 13° C. or less in a rotating drum for 10 to 24 hours. After washing, the hides are defleshed with a scraping machine and the hair and epidermis are cut off with a horizontal band knife. This preliminary cleaning is accomplished with standard tannery equipment.

The remaining hair and poorly cleaned sections are cut off by hand and composites are prepared from five hides. The hide composites are then cut into ½ to 4 square inch sections and reduced to pulp by three passes through a meat grinder, each pass being a finer grind. The first and second passes are through 18 and 8 millimeter holes, respectively. The final grind is through holes 1.5 millimeters in diameter. It is important during the grinding process to keep the pulp below 20° C. This may be done by adding crushed ice to the hide sections as they are fed to the grinder.

The ground pulp is next diluted with tap water at 16° C. to give a smooth slurry containing 7.4% dry solids. This slurry (125 parts) is then treated with 125 parts of a 2.4% lactic acid water solution using an inline mixer such as that manufactured by Cherry Burell (model 24) to form a homogeneous mass of swollen collagen fibrils. It is important during this acid swelling step also that the temperature be maintained below about 25° C. The mixture so obtained contains 3.7% hide solids and 1.2% lactic acid. After the pulp is blended with acid, the mass of swollen collagen fibrils is further dispersed in a suitable homogenizer such as a Manton-Gaulin homogenizer (model 125–K–5BS), fitted with a 2-stage valve and operated with a 1500 p.s.i. drop per stage. In the ultimate fluid mass of swollen collagen fibrils so prepared the individual fibrils are freed from the fiber bundles and fibers and released from the fiber sheaths. They take up all liquid and swell from an original diameter of the order of 300 A. to 1000 A. to a freshly swollen (one day old) maximum diameter of the order of 15,000 A.

Other mixtures prepared in similar manner may contain hide solids (in the above-described form of swollen collagen fibrils) as low as about 3% and as high as about 5%, the preferred concentration of hide solids being about 4%. If the concentration is less than 2.5% the mixture is so watery that coagulation after extrusion becomes virtually impossible, while a concentration exceeding 6% requires very high extrusion pressures due to increased viscosity and tends to formation of tough casings. The preferred concentration of lactic acid is about 1.2% but may be as low as about 0.50%.

An alternative, but less preferred method of preparing an extrudable mass of swollen collagen fibrils from animal tendon, preferably bovine tendon, is disclosed in copending application, Serial No. 58,593, filed September 20, 1960. This material also may be used in practicing the invention, although it has been found that the collagen masses formed from swollen collagen fibrils derived from fresh hide, as described above, are greatly to be preferred. In either case, however, the proportion of solids will be within the general ranges heretofore described.

The fluids mass of swollen collagen fibrils obtained by either method above described is filtered through a 7-mil filter screen to remove unswollen collagen and non-collagenous materials, and then extruded in the form of a tube, preferably in such a way as to impart some collagen fibril orientation transverse to the extrusion direction. The particular design and operation of the extruder constitutes no essential part of the present invention, but it has been found preferable to utilize the action of the extruder to effect the maximum homogeneity of fibril distribution so as to impart substantial burst strength and transverse tear strength to the tube and ultimate casing while also effecting orientation or alignment of fibrils or masses of fibrils in the direction of extrusion, particularly those adjacent the tube walls, thereby to achieve substantial longitudinal or tensile strength as well.

One form of extruder found useful in practicing the invention is disclosed in copending application Serial No. 58,593, filed September 20, 1960. However a preferred form of extruder utilizing the action of counter-rotating discs which facilitate a more homogeneous and non-oriented distribution of fibrils, especially within the interior of the casing walls, is shown and described in copending application Serial No. 82,933, filed as of even date herewith.

In accordance with the invention the extruded fluid mass of swollen collagen fibrils leaves the orifice of the extruder in the form of a tubular body of watery fluid travelling preferably upwardly into a dehydrating or coagulating bath which surrounds the orifice of the extruder and extends upwardly therefrom (not shown). As shown and described in detail in said copending application Serial No. 58,593, filed September 20, 1960, the initial coagulating bath into which the extruded tubular body immediately passes is preferably in the form of a vertical column of liquid constituting a housing surrounding and extending upwardly from the extruder orifice. A portion of this liquid flows upwardly within the extruded tubular body, passing between the extruded body and an internally disposed over-flow or return tube. The flow rate within the extruded body is quite slow, to avoid pressures and velocities harmful to the delicate extruded body, and may be, e.g., about 1 gallon per hour. Another portion of the coagulating liquid flows upwardly in the housing outside the extruded tubular body and returns through an external overflow drain for recirculation. The flow rate of said outside column of liquid may be relatively rapid, e.g., about 2 gallons per minute. Thus the inside and outside of the tubular body are initially bathed in upwardly flowing columns of a coagulating liquid.

It should be noted that the density of the extruded tubular body as it comes from the extruder orifice is substantially less than that of the coagulating salt solution into which it passes. Accordingly the tendency of the extruded tubular body is to rise and travel naturally upwardly in the coagulating liquid. This phenomenon facilitates the starting up of the extruder and the maintenance of the desired upward travel of the tubular body with the exertion of a minimum of external forces thereupon. This action occurs at that stage in the treatment of the tubular body when it is weakest and most fragile and possesses virtually no integrity of its own.

After reaching the top of the liquid housing, the tubular body is passed into and through an extended bath of the coagulating liquid for a total coagulating exposure of about 6 minutes, although this time may be as short as about 3 minutes. The means and apparatus for accomplishing this transfer and subsequent conditioning operations will be hereinafer described in detail. This coagulating treatment is the first conditioning step applied after extrusion of the tubular body. The extended coagulating bath itself is preferably an aqueous ammonium sulfate solution containing about 40% ammonium sulfate adjusted to a pH substantially higher than that of the acid-swollen collagen material, e.g., a pH of about 7.0, with some suitable alkaline material such as sodium or ammonium hydroxide. The coagulating liquids in the vertical housing above the extruder and in said extended bath are of the same aforesaid composition. The purpose served by these coagulating baths is primarily to replace the water in the extruded tubular body by ammonium sulfate solution, thereby coagulating and giving temporary form and integrity to the tubular body so that it may be handled in the subsequent conditioning operations.

The tubular body, when it passes from the extrusion nozzle or orifice, has a wall thickness determined by the annular space between the internal and external extruder tubes forming the orifice. In a preferred embodiment of the invention the external diameter of the inner extrusion tube is preferably about .75″ while the radial distance between the exterior of said inner tube and the interior wall of the external tube is about .014″. Thus the tubular body referred to will have an initial wall thickness of about .014″ (14 mils) and this thickness will be substantially maintained throughout most of the liquid conditioning treatments as hereinafter described. Ultimately, in accordance with the invention, the dried tubular body will be reduced to a wall thickness of the order of .001″ (1 mil), but the initial inner diameter of about .75″ will be preserved. These dimensions are given by way of example and are not limiting, but to illustrate the relatively great reduction in wall thickness required and achieved by practice of the invention. The casing diameter of about .75″ is typical of casings used for fresh pork sausages.

As a second conditioning step the concentration of coagulating salt in the coagulated tubular body is substantially reduced, thereby to facilitate the hardening action hereinafter described. In the preferred embodiment of the invention, hardening is effected by treatment with alum and it has been found that such treatment is effective only when the concentration of ammonium sulfate in the tubular body has been substantially reduced, yet a sufficient amount thereof retained pro tem to avoid undue softening and weakening of the coagulated tubular body. Accordingly the tubular body is pre-washed for a period of about six minutes in a much diluted water solution of ammonium sulfate (e.g., about 4% to 18%) similarly adjusted to pH of about 6.5.

In accordance with the invention, a third conditioning step constitutes a hardening of the coagulated casing by reaction of the collagen therein to alum. For this purpose the pre-washed coagulated tubular body is immersed in and treated with a solution containing, e.g., about 6% alum [$NH_4Al(SO_4)_2 \cdot 24H_2O$], 1% citric acid and 4% ammonium sulfate. The contact time is about six minutes and this alum hardening solution is maintained at pH 4.3.

This hardening treatment is sometimes called "tanning," but the primary purpose is to effect a hardening of the casing so as to make it resistant to water, which is not the case with collagen coagulated with ammonium sulfate. Without such hardening action the application of water to the tubular body coagulated with ammonium sulfate would reduce it to a formless gel. In other words the coagulation with ammonium sulfate is essentially a temporary step after which a more permanent hardening action is effected by treatment with alum. More detailed descriptions of the alum treatment with various examples thereof are given in copending application Serial No. 64,664, filed October 24, 1960.

The fourth conditioning step, in accordance with the invention, involves removal of the ammonium sulfate salt which has remained in the tubular body after the pre-wash and alum hardening steps. This excess ammonium sulfate as well as any excess alum in the tubular body are removed by a prolonged washing of the tubular body in tap water, e.g., for about twenty minutes, preferably using two or more changes of water.

The fifth step in the conditioning of the tubular body is called a plasticizing operation. This procedure involves essentially two steps, one of which is the application of a humectant such as glycerine which preserves the softness of the material after drying and helps in rehumidifying it. This plasticizing material also prevents cracking and other effects consequent upon undue drying. As an example, the plasticizing bath may contain 3.6% glycerol, 20 parts per million formaldehyde and 0.1% sodium bicarbonate. The dwell time in this bath is about five minutes.

Concomitantly with the plasticizing step, carboxymethyl-cellulose (CMC) is preferably included in the plasticizing bath and applied thereby to the tubular body. For this purpose, about 0.33% CMC is added to the bath and the glycerol concentration is preferably increased to about 4.8%. A more detailed description of the composition of this combined plasticizing and CMC bath and variations thereof are given in copending application Serial No. 64,310, filed October 24, 1960. The application of CMC has the effect of partially drawing out water from the tubular body and thereby reducing its thickness. In the example here given, the thickness reduction is from the original 14 mils to about 10 mils. Moreover as described in copending application Serial No. 64,310, the application of CMC improves the wet-strength of the casing before drying because of the proportionate increase in solid content. Moreover, it increases the burst-strength of the ultimate casing, thereby improving its properties during stuffing and cooking.

As the next or sixth conditioning step in the method, the hardened, plasticized and partially solidified tubular body is dried by hot air currents. For this purpose the casing is inflated by blowing air into and through the length thereof as it passes into a drying chamber while at the same time warm air is blown over and around the exterior. This drying air is at approximately 80° C. and 8% relative humidity and the casing is subjected to such treatment until the wall thickness of the tubular body has been reduced to about 1 mil in the example under discussion. In accordance with the invention, great care is taken during this step to prevent expansion or stretching of the air-inflated casing beyond the internal diameter imparted to it by the extrusion, e.g., .75 inch in the example given. The achievement of suitable drying can be determined by visual inspection, the dried casing tube being translucent, while the presence of moisture is indicated by a whitish, opaque color.

During the drying operation or immediately thereafter, an albumin powder may be blown into and through the inflated casing or otherwise applied, as more particularly described in application Serial No. 64,291, filed October 24, 1960. Also after drying the dried tube may be partially re-humidified, by application of moist air, to avoid brittleness or cracking.

The dried casing tube may then be subjected to automatic shirring and shirred lengths severed to form casings adapted to be stuffed on automatic stuffing machines. As a final step, prior to stuffing but after shirring, the casing is preferably subjected to a heat-curing treatment. This treatment comprises storage for about eight hours at a rising temperature bringing the casing material from room temperature to about 80° C. It is then maintained at 80° C. for some sixteen hours more, which completes the heat curing thereof.

While the moisture removal effected in the drying chamber described above may reduce the inherent moisture in the tubing to as low as about 20%, the ultimate moisture content after heat curing is preferably in the range of 10% to 30% by weight, i.e., giving a solids content in the approximate range of 70% to 90%.

The heat curing described above has the effect of increasing the hot tensile-strength of the casing during cooking and also increases its wet-strength in stuffing. It is believed that this heat-curing operation accomplishes some cross-linking or so-called tanning. While said heat curing operation is preferred, the effect thereof may be substantially obtained alternatively by adding a small amount of formaldehyde (as little as 20 parts per million) in the hardening or plasticizing bath. Formaldehyde so applied has a tanning effect, but it has been found more difficult to control.

The casing after this heat curing step will contain from about 10% to about 30% by weight of moisture and will pick up additional moisture if allowed to equilibrate at room temperature and humidity. Such casings will stuff satisfactorily if equilibrated at room temperature and a relative humidity of about 75%. To maintain the desired moisture content for stuffing, the so rehumidified casings are preferably packaged in hermetically sealed containers of metal foil or the like.

The physical state of the collagen membrane constituting the finished tubular casing material is described in detail in copending application Serial No. 82,935, filed as of even date herewith. In general it will be found that the swollen collagen fibrils, when air-dried as described, cohere to form a translucent hyaloid structure in which the individual outlines or shapes of the individual fibrils virtually disappear.

The invention is not limited to the precise number of treatment steps nor to the specific conditioning liquids, concentrations, pH values thereof and the like which are given in the foregoing examples by way of illustration. One alternative method of hardening the tubular body after coagulation thereof in ammonium sulfate is the following, which may be used in lieu of the second pre-washing step and the third alum-hardening step described above. This alternative method also reduces the amount of exposure of the tubular body to the coagulating liquid so that, in practice, passage of the tubular body through the ammonium sulfate solution in the vertical columns thereof at the mouth of the extruder will be sufficient.

In accordance with this modification, a bath of ammonium hydroxide containing about 2% ammonia at a very high pH, i.e., about pH 14 or above, is provided as the second conditioning step after the tubular body has been coagulated in the vertical columns of ammonium sulfate as described above. The tubular body is transferred directly from the ammonium sulfate coagulating bath into the ammonium hydroxide hardening bath without any intermediate pre-washing or dilution of the ammonium sulfate. The duration of the treatment in the ammonium hydroxide bath is preferably about five minutes whereupon the tubular body is sufficiently hardened to resist water washing. It is then transferred into the water washing bath for the removal of ammonium sulfate salt as described under the fourth conditioning step above, and carried through the subsequent steps in like manner.

*Physical Handling Steps and Apparatus Therefor*

Referring now to the apparatus and the physical steps involved in the handling of the extruded tubular body as it passes from the extruder through the various conditioning baths and drying operation hereinabove generally described, same will be pointed out more particularly in connection with the accompanying drawings. In the drawings, FIGS. 1–18 show two forms of apparatus for handling the tubular body as it passes from the extruder through the various conditioning baths of liquid to carry out steps one to five, inclusive, referred to above. FIGS. 19–34 disclose a preferred apparatus for effecting the drying of the tubular body by the hot air treatment referred to above as step six. The subsequent steps of shirring and heat curing generally described above do not constitute necessary parts of the present invention, but are disclosed more particularly in other copending applications.

Referring to FIG. 1, there is shown therein an apparatus designed to carry out, in accordance with the invention, successive application of several conditioning liquids to the extruded tubular body as it passes through the apparatus. The primary objective of this apparatus is to pass the extruded tubular body C through a series of baths of liquid with minimum stress and tension on the delicate and exceedingly fragile material involved. For this purpose the apparatus is designed to cause the tubular body to move into and through a series of flowing baths of conditioning liquids and it is primarily moved therethrough by the frictional travel of the conditioning liquid itself and without any substantial tension being otherwise imparted to the moving tubular body. The apparatus shown in FIG. 1 discloses a succession of two such liquid conditioning baths but it will be understood that this showing is exemplary only and that in practice the tubular body may and will be subjected to a greater number of such baths, as would be required in carrying out the five successive liquid conditioning steps described above, for example.

In FIG. 1 the apparatus generally indicated by 10 comprises a plurality of closed troughs 12 of rectangular cross-section, mounted in superposed contiguous relationship to form a tier upon a base 14. Straps 16 encircle the troughs adjacent the ends thereof and assist in maintaining them in abutting superposed positions.

The embodied means for advancing the extruded and partially coagulated tubular body C from the columnar coagulating bath immediately above and coaxial with the extruder (previously described but not shown herein) appear in the upper left-hand portion of FIG. 1. Said means comprise a vertical penstock 40 which extends upwardly a substantial distance from the mouth or entrance of the uppermost trough 12 of unit 10 so as to maintain a substantial head of hydraulic pressure in closed trough 12. As shown, the penstock has a V-shaped mouth at its upper end with inclined sides 42 and 44. The advancing tubular body C is fed downwardly into and through said penstock and is thus immediately immersed in coagulating liquid contained therein during its downward travel. Means for feeding a portion of the coagulating liquid into the top of the penstock and along the sides thereof to facilitate non-frictional travel of the body C therethrough comprise the liquid spray heads 45 disposed at either side of the V-shaped mouth of the penstock (FIG. 2).

Reservoir 61 (FIG. 1) is provided for holding a supply of the coagulating liquid A, e.g., 40% ammonium sulfate solution as described under step two. A pump 64 driven by electric motor 66 is provided for drawing liquid A from the reservoir and forcing same upwardly through condit 67 into conduit 56 which communicates with the open mouth 58 of uppermost trough 12 and with the bottom of the penstock 40. A by-pass line 69 is provided for leading a portion of the coagulating liquid to the pair of spray nozzles 45 at the top of the penstock 40.

The embodied means for advancing the partially coagulated tubular body C from the upper end of the bath surrounding the top of the extruder (not shown) downwardly and into the V-shaped mouth of penstock 40 comprises a godet roller 62 adjacent the top of the penstock 40. Roller 62 is adjusted to rotate at a constant speed which is related to the linear speed of extrusion. It serves to advance the casing in its travel from the extruder until entrainment by the flow of liquid in the trough 12.

In accordance with the invention the tubular body C is caused to travel downwardly through a series of the tiered, interconnected troughs 12 while immersed in and entrained by the flowing coagulating liquid A. Pressure is imparted to said liquid to fill the closed troughs and the flow rate of liquid A through the troughs 12 is maintained by such pressure from pump 64 and under the hydrostatic head exerted by the column of liquid in the penstock 40. It will be clear that the fragile coagulating tubular body C is thus continuously carried along and entrained by the frictional flow of the coagulant liquid in that group of the troughs 12 marked 12B, substantially without the application of any stress or tension to the body C itself, so that any danger of stretching, rupturing or distorting it is avoided.

Means are provided for transferring the travelling body C from the right-hand end of the uppermost trough 12 to the mouth of the next lower trough 12, wherein the liquid A travels in the opposite direction, and so on downwardly into and through a series of such superposed troughs 12B throughout the entire coagulating step. As shown best in FIGS. 6–9, contiguous troughs 12 are interconnected at their ends by a cap or endpiece 18 provided with a concave recess 20 therein. Cap 18 has a median element 22 with a smooth arcuate end which forms in recess 20 an elongated arcuate passage 24 having spaced entrance and exit sections 26 and 28 therein. Thus the tubular body C is caused to flow smoothly through said curved passages as it reverses direction at the end of each trough 12.

The ends of each trough 12 are provided with flanges 30 suitably secured thereto, as by cementing. Flanges 30 have a pair of spaced threaded openings 32, only one of which is shown. Openings 32 accommodate bolts 34 positioned in registering bores 36 in cap 18. Bolts 34, when threaded into position in openings 32, secure cap 18 in position against flanges 30 at the ends of a pair of contiguous troughs 12. Seals, such as resilient O-rings 38, are positioned in accommodating grooves 39 in flanges 30 to seal the connections between flanges 30 and cap 18.

As shown best in FIG. 9, when cap 18 is secured in position, member 22 thereof is aligned with the two abutting flanges 30 of the troughs 12. Thus entry section 26 is registered with the passage 11 of the upper trough 12, and exit section 28 is registered with the passage 11 of the lower trough 12, passage 24 of cap 18 effecting continuous connection from one trough 12 to the next one.

Means are provided for removing the coagulating liquid A from the last of the series of interconnected troughs 12B at the end of that step of the treatment. For this purpose, means are provided for maintaining the predetermined rate of flow of the coagulating liquid as it exits from the terminal trough 12B while at the same time the tubular body C is temporarily led out of the tier of troughs 12B so that it may be returned to the next lower one of said troughs in the group 12D where it undergoes the second liquid conditioning step. The means for effecting this transfer of the body C while concurrently withdrawing the out-flowing liquid A for recirculation are generally shown at the right-hand upper portion of FIG. 1 and parts thereof are shown in greater detail in FIGS. 10–12.

At coagulant discharge station D there is located a coagulant exit manifold 70 (FIG. 11) which includes an entry section 72 having a flange 74 adapted to register and cooperate with flange 30 of the aligned trough 12. Manifold 70 also includes a weir 76. Coagulant from aligned trough 12 entering member 70 is contained behind weir 76 until sufficient coagulant is accumulated there-behind to overflow the weir. The overflow coagulant then exits from manifold 70 through discharge conduit 78 and hydraulic line 80 for return to reservoir 63.

The tubular body C entering manifold 70 is led upwardly out of the coagulant accumulating behind weir 76 and over a second godet 82 supported on bracket 84 secured to suitable framework 86 fixed to base plate 14. Godet 82, like godet 116, is driven as described hereinbelow. By withdrawing the tubular body from the pool of liquid accumulated behind the weir, the possibility of blocking or clogging the mouth of the discharge conduit 78 by the tubular body is avoided. Such difficulties have been experienced wherever the tubular body is caused to pass adjacent to a liquid exit point and the apparatus hereinabove described obviates this difficulty.

In accordance with the invention, means are provided for next introducing the second conditioning liquid, consisting of the pre-washing diluted ammonium sulfate solution into the mouth of the uppermost of the tier of troughs 12D wherein the tubular body C is subjected to the pre-wash step. For this purpose, after passing down from godet 82, casing C enters a second penstock 88

(FIG. 10) having a side entry port 90 and a generally V-shaped mouth 92, similar to those of penstock 40. Port 90 is seated on bracket 93 secured to framework 86. The pre-washing solution is pressure-fed, preferably by gravity, from a separate reservoir 94 through hydraulic line 100 into nozzle 102 accommodated in a threaded recess 104 in port 90. The conditioning liquid from nozzle 102 is conducted through a baffle system 106 formed in port 90 and into riser 108 connected to port 90. Casing C, entering port 90 travels therethrough and into riser 108, entering the new conditioning liquid adjacent the connection between port 90 and riser 108, as shown in FIG. 10. Spray heads 91 are provided for sluicing the inclined faces of the V-shaped entry 92 with pre-wash liquid.

The other end of riser 108 has an elbow section 110 provided with a flange 111 for connecting penstock 88 to the uppermost trough 12 in group 12D directly below the last trough in group 12B. Tubular body C is then carried by the flow of the pre-wash liquid back and forth through the interconnected troughs 12D associated with penstock 88.

It will be understood that the two superposed tiers of troughs 12B and 12D shown in FIG. 1 and their interconnections are merely illustrative of the apparatus used to carry out the first two conditioning baths in the successive treatments of the tubular body C. In practice a sufficient number of groups of such troughs will be superposed in a composite magazine so as to carry out all five of the liquid conditioning steps heretofore described. A transfer mechanism similar to that located at the point D will be provided for effecting transfer of the tubular body from each group of troughs to the succeeding one concurrently with the withdrawal of one conditioning liquid and the introduction of the next one. Thus the tubular body will travel essentially without tension or stress throughout the entire structure, being entrained and carried along continuously by the series of flowing baths of liquid.

For the recirculation of the pre-wash liquid as shown in the illustrative abridged embodiment of FIG. 1, said liquid is accumulated behind weir 120 of open trough 114, the overflow exiting through conduit 122 and hydraulic line 124 for return through pump 96, driven by motor 98 and line 99, to reservoir 94. A similar recirculating means is provided for each of the conditioning liquids in the complete, five-stage system, as will be obvious.

Referring now to the construction of the godet mechanisms which are utilized to effect transfer of the traveling body C from one liquid bath to the next, it will be understood that these devices are designed so as to avoid the exertion of any appreciable tension or stress on the exceedingly delicate material of which the tubular body is formed. These godet devices are so constructed and operated that they essentially continue or maintain the travelling movement of the tubular body C at the speed imparted to it by the flow of the liquids through the troughs 12, with enough additional movement to accomplish the changes in direction of the body C as shown at such points. Thus they provide means for taking over the travelling movement of the flowing liquid during those short intervals when the tubular body is withdrawn from and returned to the liquid-carrying troughs.

Accordingly, each godet 82 and 116, illustratively shown, is preferably provided with means for varying and controlling the torque transmitted thereto. Referring to FIGS. 13 to 15, there is illustrated the drive means for godet 82. The drive for godet 116 may be substantially identical with that for godet 82, and only the specific drive mechanism for godet 82 will be described herein as typical.

Godet 82 is provided with an axial sleeve 126 which freely accommodates one end of a shaft 128. Shaft 128, in turn, is supported in bearing block 130 mounted on a bracket 132 carried by framework 86. Godet 82 is provided with a steel washer 134 on the end thereof adjacent block 130.

Intermediate the end of godet 82 and block 130, shaft 128 freely supports a hub 136. Hub 136 is provided with an annular magnet 138 which is disposed in hub 136 in cooperative relationship with washer 134. A collar 135 is fixed to and rotates with shaft 128 between the end of hub 136 and block 130. Pins 137 fixed in the end of hub 136 remote from magnet 138 are slidably accommodated in openings 139 in collar 135, thereby adapting hub 136 for conjoint rotation with collar 135 and shaft 128.

The other end of shaft 128 is provided with a second hub 140 fixed to and rotatable therewith. Hub 140, in turn, has a circular magnet 142 supported therein. To drive shaft 128, the output shaft 144 of a conventional gear motor 146 on bracket 132 is provided with a hub 148 which is positioned in abutting relation with hub 140 of shaft 128. Hub 148 has a steel washer 150 mounted therein against magnet 142, forming a magnetic coupling, the attraction between washer 150 and magnet 142 transmitting rotation from shaft 144 to shaft 128 and hence to collar 135 and hub 136. By employing a magnetic coupling between motor 146 and shaft 128, a rapid disconnecting and replacement of motor 146 can be accomplished without appreciably affecting the operation of the system.

It will be understood that godet 82 is rotated by hub 136 through the coupling formed by its washer 134 and magnet 138 of hub 136. However, since it is desired that no appreciable tension or drag be exerted on casing C, means is provided for adjusting the operative relationship of washer 134 and magnet 138 by varying the space therebetween. When more torque is to be applied to godet 82, washer 134 and magnet 138 are moved closer together. When less torque is called for, washer 134 and magnet 138 are moved apart. To accomplish this, one end of a camming element 152 is adapted for sliding travel in circular groove 154 formed in the periphery of hub 136. The other end of element 152 is provided with a threaded opening 153 adapting element 152 for travel along threaded shaft 156 rotatably supported in opening 158 in block 130. Collars 159 fix shaft 156 in position in block 130. Upon suitable rotation of shaft 156, element 152 is travelled back or forth therealong relative to block 130. Since hub 136 is loosely mounted on shaft 128, the movement of element 152 exerts an axial force against the appropriate edge of groove 154, sliding hub 136 back or forth on shaft 128 and travelling pins 137 farther back into or out of their openings 139. This movement of hub 136 decreases or widens the gap between magnet 138 and washer 134, as described, while still maintaining operative driving connection with collar 135 and shaft 128. Thus the torque applied to godet 82 from shaft 128 can be varied from a maximum, when washer 134 and magnet 138 are in contact, to a minimum when magnet 138 has been moved away from washer 134 sufficiently far that there is no rotation of godet 82 by hub 136. In practice, this control is exercised by the operator who keeps the progress of the body C under visual observation.

In accordance with one feature of the invention, means are provided for preventing distortion of the tubular body C due to the accumulation therein of bubbles or pockets P of liquid. As will be understood, the walls of the tubular body are quite permeable in the wet state and, as it travels through the conditioning baths especially during the early steps of its treatment, liquid permeates the tubular walls and accumulates therein. The invention provides means for puncturing or perforating the walls of the tubular body at one or more stages in its travel through the conditioning apparatus, thereby to release the accumulated pockets of liquid P. These perforations also serve to prevent such pockets from developing in subsequent stages of the treatment. The perforating operation is such that it does not seriously impair the strength of the tubular body and it also has the beneficial effect of providing miniature outlets in the tubular walls which serve to facilitate the air inflation of the tubular body during the drying step, as will be more particularly hereinafter described.

For these purposes, a puncture roller 160 is supported on shaft 162 rotatably carried in one end of arm 164. The other end of arm 164 is pivotally mounted on framework 86. Spring 166, which is secured at one end to the middle of arm 164 and at the other end to framework 86, biases roller 160 against godet 82.

Roller 160 has end ridges or rims 168, 170 in frictional contact with godet 82, the rotation of godet 82, described above, effecting rotation of roller 160 also. Tubular body C is trained over godet 82 between rims 168 and 170. Disposed axially on the periphery of roller 160 in spaced relation are elongated strips 172 of resilient material through each of which protrudes a barb 174 secured in roller 160. As roller 160 is rotated in engagement with godet 82, barbs 174 are successively travelled against and into the portion of body C on godet 82 positioned between ridges 168 and 170 (see FIG. 15). As the continuous ribbon of body C is travelled over godet 82, barbs 174 periodically puncture it to purge pockets P and prevent their reoccurrence. If desired, a puncture roller 160 may be associated with each godet roller 62, 82 and 116.

The perforations formed in the tubular body, as described above, cooperate with the action of the open purge tank 112 (FIG. 1) to release liquid accumulated inside the tubular body. In operation, the tubular body in the open tank 112 fills with liquid and when it is drawn out of the tank, a slight head of such liquid inside the tubing extends beyond the surface of the liquid in the tank. This head, created partly by osmotic pressure and partly by the momentum of the liquid travelling within the tubing, exerts a sufficient back pressure to force the liquid out through the perforations and into the surrounding bath in the tank.

One advantage of the above-described continuous hydraulic system for moving the tubular body through the series of baths lies in the fact that said system continuously and automatically adapts itself to changes in length (either shrinkage or expansion) which may occur in the tubular body "C." Very slight changes in the length of such a material would have serious cumulative effects in conventional handling systems for continuous flexible material. However, because in the present invention the material is essentially continuously supported in liquid any changes in tension are distributed throughout the entire length of the liquid baths so that there is no cumulative tension or slacking effect and the amount of change in tension at any particular point is very small. Moreover the controllable magnetic drives for the various godets also maintain a constant torque so that they adapt themselves automatically to changes in the length of the tubular body itself. This built-in protection against the effect of changes in length of the tubular body also arises from the provision of open troughs 114 which, in practice, are preferably provided at the end of each series of closed troughs. The flow of liquid in the open troughs is substantially slower than in the closed troughs because of the increased cross-section. This more slowly flowing liquid therefore provides slack zones which contribute to the accommodation of changes in length and stress in the tubular body.

In the hydraulic system, it is also desirable to maintain the temperature of each of the liquid conditioning baths below 25° C., thereby avoiding temperature degradation of the collagen.

The advantages of the closed-trough system above-described are several. They require less head pressure for a normal operation because the closed troughs act like pipes in responding to and maintaining hydraulic pressures. Closed troughs prevent vapors, such as ammonia gas, from escaping into the plant and in general reduce evaporation losses.

On the other hand there are some disadvantages in a closed-trough system and some compensating advantages in an open-trough system. Thus the progress of the material through a closed trough is not subject to visual observation, so that a tangling of the tubular body or other stoppages are not readily apparent (as they are in an open trough) nor can they so readily be corrected. There is a practical limit to the speed of flow in the pressurized closed-trough system. On the other hand the speed of gravity flow in open troughs can be readily adjusted within wide limits by variously inclining them. The costs of installation and maintenance of an open trough system are lower. It adapts itself to multiple parallel systems which can be serviced by a single system of drive motors, godets, etc. Such open troughs can also be made of relatively great length, thereby reducing height in the machine and the need for many turning guides at the ends of superposed troughs.

As a modification of the above-described liquid-carrying closed-trough structure 10, the invention contemplates the use of open troughs of a somewhat simpler construction than that of the closed-trough system and arrangement.

A present preferred embodiment of such an open-trough system is illustrated in FIGS. 16–18. A tier of elongated, superposed, substantially level open troughs 200 is disposed and used in substantially the same manner as the closed-trough system 10 heretofore described. Each open trough is closed by an end wall 202 and has vertical side walls 204 but no top member or cover. The receiving end of the uppermost trough 200 is provided with a transverse idler godet or roller 206 for receiving and turning the tubular body to pass lengthwise of the trough to undergo the flow entrainment of the liquid flowing therealong. At the opposite end of said uppermost trough a similar rotatable roller or godet 208 is mounted to turn on an axis below that of the plane of the bottom 209 of the trough so that the tubular body will be turned and passed downwardly and in the reverse direction into the liquid flowing in the next lower trough. The lower portion of the end wall 202 is curved inwardly and downwardly to form an arcuate closure at 212 and to merge with the flat bottom 213 of the next lower trough in the series. As will be clear from the drawings the same cascading construction is repeated at the opposite end of the second trough and so on throughout the entire tier. The path of the tubular body C through the system of troughs is indicated diagrammatically in FIG. 16.

Means are shown for supplying successive liquids to provide successive conditioning baths in different groups of troughs while continuing the flowing movement of the body C therethrough. The purposes of these transfer means are the same as heretofore described in connection with the closed-trough system and a simplified showing thereof is here made somewhat diagrammatically to avoid repetition. As shown, the uppermost five troughs are designed to receive a given conditioning liquid which may be introduced into the system through the inlet 220 and housing 221 at the upper open end of the uppermost trough. The solution is preferably introduced under some hydrostatic pressure so that it will flow throughout the group of troughs although they, in the embodiment shown, are level. If desired, however, as previously indicated, individual troughs may be inclined so as to effect a gravity flow and the inclination of various troughs may be adjusted to modify the rate of flow if desired.

At the end of the fifth trough of the upper series, an extension 223 is provided whereby the tubular body may be temporarily withdrawn from the liquid in said trough and then directed into the next lower trough which contains a different conditioning liquid. For this purpose a godet or roller 222 is mounted above the end of said upper trough and a second godet 224 is mounted to turn on an axis beyond and above the end of said trough, such mounting being provided by upwardly extending brackets 226. The godet 224 is driven by driving means such as those previously described in connection with FIGS. 13–15 hereof.

An outlet for the removal of the first conditioning solution is provided in the bottom of the extended trough at 228. The next lower or receiving trough 230 is provided with an even longer extension at 232 in which a reversely turning godet 234 is mounted to direct the tubular body back into the trough 230 and the liquid therein. An inlet 236 is provided for introduction of the second conditioning liquid into said trough 230 through housing 237 thereat.

As will be clear from the drawings, a similar device may be provided at the end of the lowermost trough 240 of the tier shown in the drawings whereby the second conditioning liquid may be withdrawn and a third one introduced if desired. It will be understood that this showing is illustrative of the construction and operation of two sections or groups of troughs in an open trough system and that in practice a greater number of troughs and a greater number of conditioning liquids will be employed with their accompanying auxiliary apparatus.

*Drying Method and Apparatus*

As the final step in the method of the present invention prior to shirring the tubular casing material, the tubular body as it comes from the plasticizing bath is subjected to the drying and inflating actions of hot air currents. These hot air currents rapidly reduce the liquid content of the tubular body by evaporation so as to produce exceedingly thin-walled casing tubes having, in the present example, a thickness of approximately 1 mil. As previously described the thickness of the tubular body as it enters the drying apparatus is approximately 10 mils, having been reduced from the original extruded thickness of about 14 mils by the action of the CMC in the plasticizing bath.

Also in accordance with the invention the tubular body is inflated with air during its travel through the drying apparatus so as to maintain the desired tubular shape, uniformly expose all wall surfaces to the drying action and, at the same time, maintain substantially the internal diameter imparted to the tubular body by the extruder, thereby avoiding stretching during drying and the consequent loss of the power to stretch as desired during the wetting accompanying the stuffing and linking operations in forming linked sausages.

Referring now to FIG. 24, the general arrangement of parts in the drying apparatus and the course of the tubular body thereinto and therethrough is somewhat diagrammatically portrayed. As shown, the drying apparatus consists essentially of an elongated rectangular chamber 300 (shown more completely in FIGS. 19, 20 and 23). Generally described, the drying operation includes leading the tubular body, after it has been withdrawn from the plasticizing bath, through a set of feeding rollers generally indicated at 302 and into the drying chamber 300. The casing body is preferably inflated with air so as to maintain an air bubble therein before it passes through the feeding rollers, although the inflation thereof can begin at the point where it enters the drying chamber. The inflated casing passes through the chamber in a series of back and forth courses during which it is subjected externally to jets or currents of hot air directed against its periphery angularly in the direction of its travel, preferably at about 1800 feet per minute and at 150°–200° F. The passage of the tubular body through the drying chamber is facilitated by various driven and idle godet devices hereinafter described. The drying process normally occupies about two minutes, whereupon the dried tube is led from the drying chamber directly onto a shirring mandrel 400 where it is shirred by suitable mechanism not shown.

The invention also includes means for initially inflating the tubular body and threading the inflating means with the tubular body through the drying chamber and these auxiliary means will be described after a more particularized description of the drying apparatus during normal continuous operation.

Referring now more particularly to the drying apparatus (FIGS. 19, 20 and 23) the drying chamber 300 is designed and arranged to accommodate two parallel lines of tubular bodies passing therethrough. It will be understood that these parallel lines are duplicates arranged in mirror relation to each other and in general the following description will be confined to one of said lines as typical. The chamber 300 which in practice is some 38 ft. long, 4 ft. wide and 8 ft. high, is supported on a base framework 304 with closed end walls 305 and 306 and a flat closed top 307. The side wall members 308 and 309 (FIG. 23) extend upwardly from the bottom for only a part of the height. Above them there are provided a series of hinged doors 310 along either side of the chamber and said doors are preferably provided with windows 311 of glass or the like for the purpose of permitting continuous observation of the tubular body as it passes through the drying chamber.

The dual drying chamber itself is vertically divided by a central partition 312 to form two plenum chambers 313 and 314 extending throughout the length of the chamber 300 (FIG. 23). Said plenum chambers are provided with hot air under pressure by means hereinafter described and serve as distributing manifolds for the currents or jets of air used to dry the tubular body in its passage through the drying apparatus. For this latter purpose, each plenum chamber is separated from the adjacent external or side chambers 316 and 318, through which the tubular bodies pass, by vertical partitions 317 and 319, respectively. These latter partitions are coextensive with the central partition 312. As appears from FIG. 23 the drying chambers 316 and 318 through which the tubular bodies are conducted, are relatively high and narrow in extent and lie between the partitions 317 and 319 and the side doors 310. The lower part of the drying chamber 300, coextensive with the side walls 308 and 309, is divided from the upper part by horizontal partition 320, which extends across the entire width of the main chamber 300 and thus provides a bottom for the upper plenum chambers and for the side drying chambers 316 and 318. An extension 321 of the central vertical partition extends to the bottom of the main chamber 300 thus dividing the bottom portion thereof into two coextensive return air chambers 322 and 324. The bottom of the latter return air chambers is formed by the horizontal cross partition 323 lying on the foundation frame 304.

Referring now to the embodied means for providing the required heated air supply to the apparatus, a separate supply thereof is provided for each of the side-by-side plenum chambers 313 and 314. As shown in FIGS. 19 and 20, vertically disposed heat exchangers 330 and 331 are mounted on the top 307 of the main chamber. The air, heated by these exchangers to the temperature in the range 150°–200° F., is blown by fans 332 and 333 into conduits 334 and 335, respectively, downwardly into the longitudinal plenum chambers through suitable openings in the top 307 at either side of the central partition 312. Through openings formed in the walls 317 and 319 (hereinafter described in detail) the hot pressurized air passes into the side drying chambers 316 and 318 where it is directed in jets against the travelling tubular body C as it passes back and forth in some seven horizontal courses through said side drying chambers. Longitudinal slots 340 and 342 are provided at the bottoms of the side chambers 316 and 318, respectively, for the exit of drying air therefrom and said slots are adjustable in width by slidable members 343 and 344, respectively. Thence the air passes into the bottom return ducts or chamber 322 and 324 and thence upwardly through ducts 346 and 348, respectively, to upper return chambers 347 and 349 connected to the heat exchangers. Means are provided for venting a portion of the return air and replacing it with a variable amount of fresh air. This arrangement permits the operator to control the moisture content of the circulating air for optimum drying effect. Each duct 346 and 348 is provided with an associated vent stack 350 and 352 for venting a portion of the return air in ducts 346 and 348. Each stack 350 and 352 is provided with a suction fan 351 and 353 which blows a portion of the return air upwardly through its associated stack. A damper 355 on each stack 350 and 352 controls the amount of return air vented therethrough. Each chamber 347 and 349 is provided with an air intake 359 and damper 357 to selectively admit fresh air to its associated return chamber for inclusion with the recirculating air through heat exchangers 330 and 331. An operator can, by suitably setting dampers 355 and 357, vent the desired amount of recirculating air and admit the desired amount of fresh air into the system.

Referring now to the embodied means for travelling the inflated tubular body through the air chambers 316 and 318 while subjecting the same to drying and advancing jets of air, the inflated body is, as stated above, moved through seven horizontal courses of alternating direction in its passage through the apparatus. In each of these courses the tubular body is movably supported by rotatable idling rollers 354 which are spaced at suitable points along the walls 317 and 319 so as to prevent sagging. These rollers are rotatably mounted on axles 355 which are fixed to the inner faces of walls 317 and 319 by threaded ends and lock nut assemblies 356. The tubular body is also guided in its passage by vertically disposed idling rollers 358 which are suitably spaced along the courses and provide rolling frictional contact with the sides of the travelling tubular body.

The tubular body is guided through its course in the drying chamber primarily by driven rotatable double-track godets 360, three of which lie in a vertical row at the right hand or exit end of chamber 300. Said godets are driven by chain drive 361 from a constant speed motor 362 (FIG. 27). The godets are of a double-track construction (FIGS. 30 and 31) with a separate inner track 450 around which is trained the threading belt of the threading operation hereinafter described. The outer track 452 of the godet supports the inflated casing during its passage through the drier. The torque of the outer track is adjusted to transmit a light and constant tension to the casing as it passes therearound, thereby preventing distortion or injury. Further details of the construction and operation of these double-track godets is given below.

At the opposite end of the chamber 300 a similar series of godets or drums 364 are mounted and serve a similar purpose at that end of the apparatus. Said godets are driven by chain drive 365 which is actuated by a reversing motor 366 through connections hereinafter described. Adjacent either set of godets 360 and 364 there are provided similar idle godets 366 and 368, respectively, for providing additional support to the tubular body as it passes from the bottom surfaces of said driving godets. At the end of its terminal course an opening 370 is provided in the exit wall 306 of the main chamber through which the dried casing tube passes over idle godet 371 and thence on to the shirring mandrel 400.

The principal means for moving the tubular body C through the drying chamber 300 is the pull exerted on the dried end thereof after it exits from the drying chamber. This pull is furnished by rubber-coated driven rollers 460 and 462 (FIGS. 28 and 29) which embrace the shirring mandrel 400 and seal the air pressure in the body as hereinafter described in more detail.

The embodied means for distributing and forcing heated air currents against the exterior of the tubular body as it passes through the apparatus comprise a series of cylindrical air current distributing manifolds, 374, only one of which will be described in detail (FIGS. 25 and 26). These manifolds 374 are formed as cylinders having closed ends 375. They are supported on bolts 376 which extend from suitable head and washer connections 377 against the interiors of the inner walls 317 and 319, respectively. The inwardly projecting threaded ends 378 of said bolts are tightened by wing nuts against the inner faces of the end members 375. The ends of the cylindrical casings 374 which lie against the faces of walls 317 and 319, respectively, are open and are held in position by inwardly turned circular flanges 379 formed in said walls. These flanges in turn have circular openings 380 therein for leading air from the plenum chambers into the cylindrical casings 374.

The casings or manifolds 374 are provided with air jet slots 382 extending as elements in the cylindrical walls and lying respectively above and below the paths of travel of the inflated tubular body C. As shown in FIG. 29, the openings 382 are so positioned as to provide concentrated air jets downwardly at an angle in the direction of travel of the body C in the case of those manifolds which lie above the courses of said body C and upwardly in the case of those manifolds lying therebelow. Thus the travelling tubular body is subjected to drying air blasts throughout its courses which serve both to evaporate moisture in the tubular body and to promote its travel along the courses. The upwardly directed air jets also serve to float or sustain the tubular body on a cushion of air so as to minimize friction in its passage through the drying chamber.

Means for regulating the size of the openings 382 in the manifolds are preferably provided in the form of external, rotatable, slotted collars 384 which can be manually adjusted to vary the effective size of the openings 382 as will be obvious.

Figure 22:
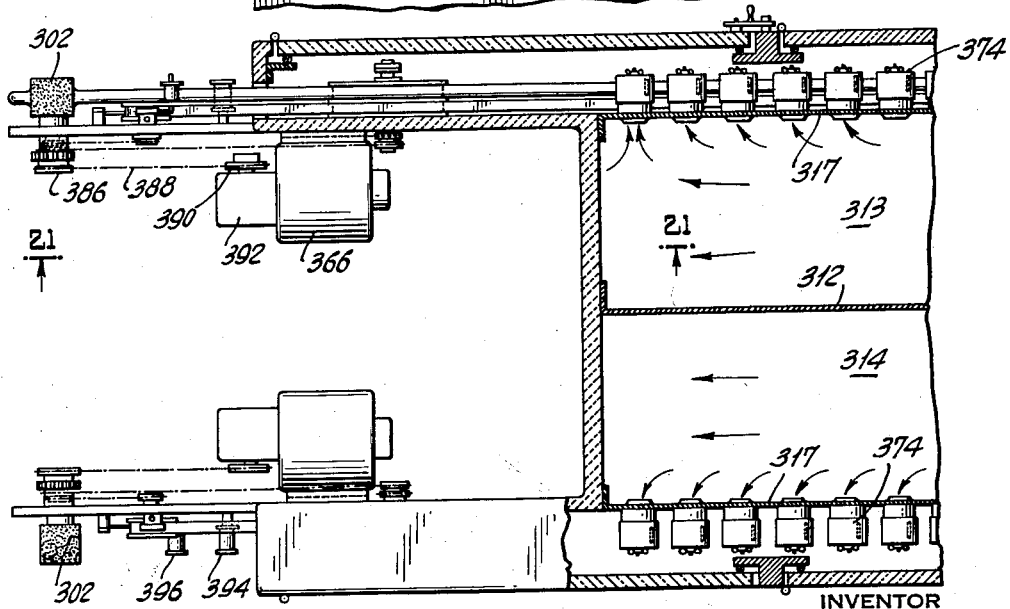
FIG. 22 is a fragmentary horizontal section taken on line 22—22 of FIG. 21.

As shown in FIGS. 21 and 22, means are provided for driving the feed rollers 302 as well as chain 365 from the motor 366 by a sprocket wheel 386 engaged by the drive chain 388 which is driven by sprocket 390 on the motor gear-reduction box 392. The rollers 302 have geared engagement with each other and with the sprocket 386. The surfaces of said rollers 302 are covered with suitable cushioning material, such as sponge rubber, for engaging the hardened but still moist and delicate tubular body as it is drawn from the plasticizing tank K. As previously stated, the tubular body C is preferably air-inflated back to a point prior to its engagement between the rollers 302, which are suitably spaced for that purpose, although alternatively the tubular body may be inflated only at the point where it enters the drying chamber 300, as it passes over the idle guide and support roller 394 thereat.

For further controlling the rate of feed of the tubular body at this point, a pivotally mounted dancer roller 396, diagrammatically shown in FIG. 24, is located between the feed rolls 302 and guide roll 394 for sensing the slack or tension developed in the casing as it is fed, and accordingly decreases or increases the speed of rotation of the feed rolls.

In the normal continuous operation of the drying apparatus, air for inflating the tubular body C as it travels therethrough is provided at the shirring mandrel 400 onto which the advancing dried casing tube is threaded for the shirring operation. For this purpose the shirring mandrel is hollow and an adjustable quantity of air under pressure is fed therethrough, from a source not shown, into the surrounding casing tube and throughout the length thereof in the drying chamber. The inflated state of the tubular body is diagrammatically indicated at the entry and exit ports in the chamber 300 but it will be understood that this inflation is maintained throughout its passage through the drying chamber.

The inflation of the tubular body C while drying is carefully regulated as it passes through chamber 300 so that the internal extrusion diameter is substantially preserved and expansion or diametral stretching is avoided.

As explained hereinabove, this inflation control is important to preserve the capacity of the stuffed, wetted casings to link properly. The desired amount of inflation is controlled by the drying apparatus operator through suitable control valves 390 on the air feed to the shirring mandrel 400. The operator keeps the drying body C under visual observation throughout its passage through drying chamber 300 by means of the transparent doors 310 described above. The desired controlled inflation of the tubular body C, without undue back pressure on the one hand or loss of pressure on the other, is facilitated by the puncture holes formed in the tubular body by the puncturing means shown in FIGS. 13–15 and hereinbefore described.

The previous description of the drying apparatus has been confined to the production state wherein the inflated casing is in continuous progress through the drying chamber. In accordance with the invention, however, auxiliary means are provided for initially inflating the tubular body C prior to its entrance into the chamber 300 and for threading it through the various drying courses in said chamber after inflation and preparatory to attaching it to the hollow shirring mandrel 400 for subsequent continuous operation. These auxiliary means comprise essentially a flexible air hose which is drawn through the courses in the drying chamber to engage the tubular body for initial inflation thereof and a travelling belt which pulls the air hose through the courses in the chamber and is reversibly movable to return the air hose to the point of beginning together with the inflated body C attached to it.

As embodied, a flexible endless belt 410, hereinafter called the "threading belt," is mounted to pass through the chamber 300 on a series of courses parallel to those taken by the tubular body C. For this purpose a plurality of relatively short and thick idle rollers 412 are mounted to extend from the walls 317 and 319 of the drying chambers to support the belt 410 between said walls and the pathways of the tubular body C as it travels over its supporting rollers 354. The belt 410 is supported on tracks 450 of godets 360 and 364 so as to travel in planes essentially parallel to the horizontal axis of the inflated body C (FIG. 26). As shown in FIG. 24, twin belts 410 are caused to return into the chamber around exit godets 371 along the bottoms of the drying chambers 316 and 318, respectively, thence upwardly along the rear wall of chamber 300 around rollers 414 and 416. At the latter point the belt is fed out of the chamber in a short horizontal course, passes over the external godet 418 which is drivingly connected to the rollers 302 by chain and sprocket connection 420 and thence returns into the drying chamber on a course parallel to the upper course of the tubular body C. It will be apparent that the belt 410 is thus advanced by the driven godet 418 around tracks 450 on paths parallel to that of body C. A spring-biased roller 417, bearing against godet 418, provides means for varying the tension in belt 410.

A flexible hose 430 for temporarily supplying compressed air to initially inflate the tubular body C is designed to be temporarily attached to the threading belt 410 so as to be drawn through the drying chamber courses. As shown in FIG. 27 the end of hose 430 is provided with a nozzle 432 to which the open end of body C may be removably attached as by a rubber band 434.

Because at this point the leading end of the tubular body C is still in the wet state and therefore quite tender and delicate, it is desirable to give it a preliminary quick-drying to toughen it so that it will withstand the pull exerted on it by the air hose. For this purpose the leading end of tubular body C is dried by heated air from blower 419 located at the entrance to drying chamber 300 and directed against body C. When the leading end of tubular body C is thoroughly dried, blower 419 is turned off and the leading end of tubular body C is attached to nozzle 432 by rubber band 434 as aforesaid.

The nozzle is attached to the belt 410 to travel parallel therewith, as by an arm 436, one end of which removably engages the nozzle by a spring-clamp 438 while the other end of said arm is threaded to be screwed into a suitable socket formed in a metal link member 440 which is laced into the ends of belt 410. Thus the belt 410 is adapted to pull the air hose 430 along the same path as that travelled by the inflated casing tubing C.

In operation the air hose is first pulled or threaded through the drying chamber until its nozzle is brought out of the chamber 300 and to a point behind godet 418 where it can be engaged with the open end of tubular body C, as above-described. The air pressure is then turned on and the body C inflated to the desired diameter, either back to the bite of the rollers 302 or even further back if desired. For the purpose of moving the threading belt and the air hose in said reverse direction the motor 366 is reversible to drive godet 418 in the rearward direction.

After the air hose has been attached to and has inflated the tubular body as described, then the motor 366 is reversed reversing the direction of rotation of godet 418 and the air hose and belt are moved in the forward direction through the courses in chamber 300. When the inflated casing and air hose nozzle are thus brought into proximity with the hollow shirring mandrel 400 the nozzle is disconnected, the mandrel is inserted into the end of tubular body C and the air pressure therefrom maintains the desired inflation of the casing tubing as previously described. Also the mandrel serves to blow powdered albumin into the inflating tubing (from a source not shown) as described above.

Referring to FIGS. 28 and 29, these show a preferred means for maintaining air pressure in the tubing while it is being drawn through the drying chamber and onto the shirring mandrel. As embodied, rollers 460 and 462 are mounted above and below the shirring mandrel 400, respectively, for engaging and feeding the inflated casing tube C along the mandrel and toward the shirring rollers (not shown per se). Said rollers 460 and 462 are provided with compressible coverings 464 made of sponge rubber or similar material which engage the top and bottom surfaces of the body C and compress and completely enfold same against and around the exterior surface of the mandrel 400, as shown in FIG. 29. The rubber coverings 464 are sufficiently thick and extensive to meet at the line 465 which is the plane of the horizontal axis of said mandrel. This construction serves to block the escape of air from the inflated body C forwardly and thereby maintain its inflation throughout the courses of the drying chamber as described above, while at the same time drawing the tubular body through the drying chamber.

FIGS. 30 and 31 illustrate in detail the construction of the sets of godets 360 and 364 previously described, for supporting the threading belt 410 and the inflated tubular body C at either end of the courses in the drying chamber. Each godet 360 and 364 is of double track construction with inner track 450 thereof supporting belt 410 while outer track 452 supports the inflated casing. Tracks 450 and 452 are separate but freely supported in common on a central shaft 454 extending through walls 317 and 319 and driven by chains 361 and 362. Inner track 450 is free at all times on shaft 454, but outer track 452 is adjustably driven from shaft 454 in the direction of casing travel. Track 452 is driven rather than being free on shaft 454 to eliminate any tension or pull that might be developed in the tubing due to the inertial resistance of the track to rotation in the direction of casing travel during the movement of the casing thereabout as it passes through the dryer. However, the torque transmitted by track 452 to the inflated tubing is adjustably controlled so that a light constant tension is transmitted to the tubing as it passes therearound. This is accomplished by securing a steel washer 456 to the outer face of track 452 around shaft 454. A magnet 458 is axially positioned on the free end of shaft 454 and adapted for threaded travel therealong toward and away from steel washer 456. By suitably varying the distance between the steel washer 456 and the magnet 454, the torque transmitted from the rotating shaft 454 to track 452 can be adjusted by the operator to eliminate undesirable pull on the casing. It will also be noted that godets 360 and 364 are of relatively wide diameters, thereby to eliminate kinking or abrupt bends in the tubular body.

Referring now to FIGS. 32–34, various means are therein shown for effecting a preliminary wiping of the tubular body C as it is drawn upwardly from the bath K to the feeding rollers 302. It has been found desirable to thus preliminarily remove a substantial amount of the adherent liquid clinging to the surface of the tubular body C promptly after it has been inflated and is being withdrawn from the tank K. One means for accomplishing this purpose is shown in FIG. 32 and comprises a series of three sets of superposed flexible wipers or fingers 470 of soft rubber or the like. These wipers may be circular or arcuate or flat so as to engage the surface of body C and are inclined downwardly toward the axis of said body, the spaces between opposed wipers being less than that of the external diameter of the body C. The operation of said wipers 470 in gently removing surface liquid from the body will be obvious from the drawing.

A modified device for effecting the same result is shown in FIG. 33 wherein a series of superposed soft flexible wipers 474 are mounted at three levels on one side of the rising body C while a similar series of wipers 476 are mounted on the opposite side of said body and in staggered relationship vertically with respect to the wipers 474.

A third modification for wiping the exterior of body C is shown in FIG. 34. This device consists simply of a flexible ring 478 of soft rubber or the like. The ring surrounds the rising body C and is of an interior diameter somewhat less than that of the inflated body so that it serves to wipe the rising surface thereof as shown.

The invention in its broader aspects is not limited to the specific mechanisms shown and described, but departures may be made therefrom within the scope of the accompanying claims without departing from the principles of the invention and without sacrificing its chief advantages.

The present application is a continuation-in-part of my copending application Serial No. 58,593, filed September 20, 1960, which in turn is a continuation-in-part of Serial No. 845,735, filed October 12, 1959, and now abandoned.

What is claimed is:

1. In the method of producing a tubular collagen casing the steps of:
   extruding a continuous, fragile tubular body from a fluid mass of swollen collagen fibrils made by acid swelling of unlimed, dehaired animal hide having a collagen solids content in the range of more than 2.5% and less than 6% by weight;
   applying a coagulant to said tubular body;
   hardening the coagulated body;
   washing coagulant from the hardened body;
   maintaining substantially the same wall thickness in said tubular body throughout the aforesaid steps of coagulating, hardening and washing said body;
   and drying said body.

2. In the method of producing a tubular collagen casing the steps of:
   extruding a continuous, fragile tubular body from a fluid mass of swollen collagen fibrils made by acid swelling of unlimed, dehaired animal hide having a collagen solids content between 2.5% and 6% by weight;
   applying a coagulant to said tubular body;
   hardening the coagulated body;
   washing coagulant from the hardened body;
   maintaining substantially the same wall thickness in said tubular body throughout the aforesaid steps of coagulating, hardening and washing said body;
   and drying said body,
   while maintaining the internal diameter of said body substantially equal to that at which it is extruded.

3. In the method of producing a tubular collagen casing the steps of:
   extruding a continuous, fragile tubular body from a fluid mass of swollen collagen fibrils made by acid swelling of unlimed, dehaired animal hide having a collagen solids content in the range of more than 2.5% and less than 6% by weight;
   immersing said body in a solution of ammonium sulfate to coagulate the collagen therein;
   immersing the coagulated body in an alum solution to harden the body and render it resistant to softening by water;
   water washing the hardened body;
   immersing the washed, hardened body in a plasticizing solution;
   and drying said body.

4. In a method of producing collagen casings the steps of:
   extruding a fluid mass of swollen collagen fibrils made by acid swelling of unlimed, dehaired animal hide and having a collagen solids content of between 2.5% and 6% in the form of a relatively thick-walled tubular body;
   applying a plurality of liquid conditioning agents to said body while substantially maintaining the aforesaid collagen solids content therein;
   and reducing the wall thickness by air-drying to produce a very thin-walled collagen tubing while maintaining the inner diameter of said tubing substantially equal to that of the extruded tubular body.

5. In a method of producing collagen casings the steps of:
   extruding a tubular body from a fluid mass of swollen collagen fibrils made by acid swelling of unlimed, dehaired animal hide;
   having a collagen solids content of between 2.5% and 6% hardening said body in the wet state;
   and drying said hardened body by passing it through a drying chamber and subjecting it therein to heated currents of air in the form of jets directed at the exterior thereof while maintaining the drying body in the form of a tube by inflation with air under pressure.

6. In a method of producing collagen casings the steps of:
   extruding a tubular body from a fluid mass of swollen collagen fibrils made by acid swelling of unlimed, dehaired animal hide;
   hardening said body in the wet state;
   and drying said hardened body by passing it through a drying chamber and subjecting it therein to heated currents of air while maintaining the drying body in the form of a tube by inflation with air under pressure and controlling the pressure of said inflating air so as to maintain the inner diameter of the tube substantially the same as that at which it was extruded in the wet state.

7. In the method of producing a thin-walled tubular collagen casing the steps of:
   extruding a continuous tubular body from a fluid mass of swollen collagen fibrils made by acid swelling of unlimed, dehaired, comminuted bovine hide,
   said mass having a collagen solids content between 2.5% and 6%,
   passing said tubular body upwardly from the extruder through a liquid of greater density than that of said body, coagulating the collagen in said extruded body, rendering said coagulated body resistant to water by a hardening agent, removing the coagulant from said body by water, and drying said body in tubular form.

8. The method set forth in claim 7 wherein the drying of said body is effected by inflating the body with gas under pressure, subjecting the exterior of said body to heat and evaporation, and controlling the inflating pressure during drying to maintain the internal diameter of said body substantially equal to that at which it was extruded.

References Cited in the file of this patent

UNITED STATES PATENTS

| | | |
|---|---|---|
| 1,612,508 | Henderson et al. | Dec. 28, 1926 |
| 1,871,100 | Walton et al. | Aug. 9, 1932 |
| 2,043,172 | Hewitt | June 2, 1936 |
| 2,195,930 | Koch | Apr. 2, 1940 |
| 2,254,203 | Bender | Sept. 2, 1941 |
| 2,271,932 | Atkinson | Feb. 3, 1942 |
| 2,275,348 | Charch | Mar. 3, 1942 |
| 2,307,614 | Becker | Jan. 5, 1943 |
| 2,351,208 | Herrman et al. | June 13, 1944 |
| 2,979,767 | Fry | Apr. 18, 1961 |
| 2,999,756 | Shiner et al. | Sept. 12, 1961 |
| 3,071,477 | Klevens | Jan. 1, 1963 |